(12) United States Patent
Zhu

(10) Patent No.: US 6,195,459 B1
(45) Date of Patent: Feb. 27, 2001

(54) ZONE SEGMENTATION FOR IMAGE DISPLAY

(75) Inventor: Julie Yan Zhu, Epping (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/767,804

(22) Filed: Dec. 17, 1996

(30) Foreign Application Priority Data

Dec. 21, 1995 (AU) .................................................. PN7272

(51) Int. Cl.⁷ ...................................................... G06K 9/34
(52) U.S. Cl. .......................... 382/176; 382/155; 382/161
(58) Field of Search .................................... 382/176, 155, 382/161, 157, 173

(56) References Cited

U.S. PATENT DOCUMENTS

| | | | | |
|---|---|---|---|---|
| 5,159,667 | * | 10/1992 | Borrey et al. ......................... | 382/171 |
| 5,425,108 | | 6/1995 | Hwang et al. ......................... | 382/105 |
| 5,765,029 | * | 6/1998 | Schweid et al. ...................... | 382/173 |
| 5,850,490 | * | 12/1998 | Johnson ............................... | 382/306 |

* cited by examiner

Primary Examiner—Phuoc Tran
(74) Attorney, Agent, or Firm—Fitzpatrick, Cella, Harper & Scinto

(57) ABSTRACT

The present invention provides a method and apparatus for detecting in an image text-like portions and non-text-like portions. The method includes the steps of establishing a set of fuzzy detection rules for distinguishing text-like portions of an image from non-text-like portions of an image, dividing the test image into a plurality of segment, and applying the set of fuzzy detection rules to each segment of the test image to thereby classify each segment as text-like or non-text-like. Preferably, the establishing step includes the sub-steps of identifying a plurality of image features that distinguish different portions of an image, generating a plurality of fuzzy detection rules by applying different combinations of the features to a text-like learning image and to a non-text-like learning image, and minimizing the rules to exclude those rules not supported by a predetermined amount of the learning images, and allocating the non-excluded rules to the set. Optionally, the generating sub-step includes the sub-steps of normalising each image feature to have a value in the range 0 to 1, partitioning each input feature space into a plurality of equally spaced region, assigning each input feature to a label of one of the regions to maximize a membership value of the label in the one region, selecting for each the region the maximized label for each feature to thus form a respective fuzzy rule.

66 Claims, 18 Drawing Sheets

Fig. 15

ZONE SEGMENTATION FOR IMAGE DISPLAY

FIELD OF THE INVENTION

The present invention relates to the display of images by electronic display apparatus such as "video" type display devices and, in particular, discloses methods and apparatus by which efficient updating of such displays can be obtained.

BACKGROUND ART

Personal computers, computerised work stations and desktop publishing systems, for example, typically incorporate one or more electronic displays by which images are presented to the user to enable manipulation of such systems to perform certain functions and also for the mere presentation of information. Traditionally, such displays have comprised cathode ray tubes devices, which are more commonly known as video displays, and in which image data is displayed in a rasterised format either using interlaced sequential fields or in a non-interlaced manner. Such devices typically have an image display rate of 25 to 30 frames per second (ie. 50 to 60 fields per second), depending upon the particular standard being used. Such arrangements are also utilised for the display of television and other video type signals.

Images displayed on such devices typically comprise text, graphic object animation or symbols, and natural (photographic) type images. Because of the relatively high refresh rate of video displays, there is generally no need to distinguish between different image components in such systems in order to ensure the display of continuous, smooth images. Such arrangements typically require significant computational overhead to ensure regular maintenance of the display and the updating of the image portions thereon.

However, there exist display devices which can operate at lower refresh rates and which permit display management operation utilising lower computational overheads. An example of such a display is a ferroelectric liquid crystal field (FLCD) which can be operated at a refresh rate as low as six frames per second, thus permitting image latency well in excess of that detectable by the human eye. Such low refresh rates permit the computational overhead associated with display management to be reduced compared with that of cathode ray tube devices.

However, difficulties arise with utilising such low refresh for modern computing and desktop publishing applications, for example. In particular, where portions of the image comprise text, it is often the case that those portions of the image are only updated at a relatively slow rate that can be well accommodated by low refresh rates such as six frames per second. However, where complex images such as some animation and natural (photographic-type) images are to be displayed, low refresh rates can provide a significant deterioration in image quality. This is particularly the case with moving images when displayed on such devices, but can also apply to the display of relatively complex static images.

Some methods have been proposed to overcome this difficulty and include halftoning and dithering the image in different manners. However, whilst such methods can provide adequate results for a natural image for example, such systems are not so advantageous for text images, and vice versa. Arrangements have also been proposed which detect movement in portions of the display, utilising threshold techniques which permit identifying that portion of the display that needs to be refreshed at a higher rate. However, halftoning and dithering can give rise to noise in a displayed image that can be misconstrued as movement that can thus cause unnecessary updating of the display and accordingly an overuse of display management systems. These difficulties are also aggravated where the text is coloured on a coloured background, as opposed to the more traditional black on white or white on black text displays.

Accordingly, in order to ensure optimal use of die low refresh rate of such displays, a more efficient means of detecting and distinguishing between text and natural portions of an image is required.

SUMMARY OF THE INVENTION

In accordance with a first aspect of the present invention, there is provided a method of detecting in an image text-like portions and non-text-like portions, said method comprising the steps of:

(a) establishing a set of fuzzy detection rules for distinguishing text-like portions of said image from said non-text-like portions of said image;

(b) dividing the image into a plurality of segments; and (c) applying said set of fuzzy detection rules to each segment of said image to thereby classify each said segment being one of a text-like portion and a non-text-like portion.

Preferably, the establishing step comprises the sub-steps of:

identifying a plurality of image features that distinguish different portions of an image;

generating a plurality of fuzzy detection rules by applying different combinations of the features to a text-like learning image and to a non-text-like learning image; and minimizing said plurality of fuzzy detection rules to exclude rules that are not supported by a predetermined amount of the learning images, and allocating the non-excluded rules to the set.

Optionally, the generating sub-step comprises the sub-steps of:

normalising each image feature as a vector to have a value in the range 0 to 1;

partitioning each input feature space into a plurality of equally spaced regions;

assigning each input feature to a label of one of the regions to maximize a membership value of the label in the one region;

selecting for each the region the maximized label for each the feature to thus form a respective fuzzy rule.

In accordance with a second aspect of the invention, there is provided an apparatus for detecting in an image text-like portions and non-text-like portions, said apparatus comprising:

means for establishing a set of fuzzy detection rules for distinguishing text-like portions of an image from non-text-like portions of an image;

means for dividing the test image into a plurality of segments; and means for applying said set of fuzzy detection rules to each segment of said test image to thereby classify each said segment as being one of a text-like portion and a non-text-like portion.

In accordance with a third aspect of the invention, there is provided a method of zone segmenting a digital image for display on display means, wherein said digital image is processed as a plurality of blocks each having a predetermined number of pixels, said method comprising the steps of:

extracting a set of features from each block to generate a feature vector for said block;

classifying said block using a set of fuzzy rules as either a text-type image or a natural-type image dependent on said feature vector for said block.

In accordance with a fourth aspect of the invention, there is provided an apparatus for zone segmenting a digital image for display on display means, wherein said digital image is processed as a plurality of blocks each having a predetermined number of pixels, said apparatus comprising the steps of:

means for extracting a set of features from each block to generate a feature vector for said block;

means for classifying said block using a set of fuzzy rules as either a text-type image or a natural-type image dependent on said feature vector for said block.

In accordance with a fifth aspect of the invention, there is provided a display method for generating a display signal for display on a display device in response to an input video signal, said method comprising the steps of:

partitioning a frame of said input video signal into a plurality of blocks, where each block comprises a predetermined number of pixels;

extracting a set of features from each block to generate a feature vector for said block;

identifying each block using fuzzy rules as either a text-like image or a natural-like image dependent on said feature vector for said block;

storing a plurality of identified blocks in a memory;

generating said display signal at a lower data rate than said input video signal dependent upon said identified blocks, wherein a first region of said frame comprising a number of identified text-like blocks are generated differently from a second region of said frame comprising a number of identified natural-like image blocks.

In accordance with a sixth aspect of the invention, there is provided a display apparatus for generating a display signal for display on a display device in response to an input video signal, said apparatus comprising:

means for partitioning a frame of said input video signal into a plurality of blocks, where each block comprises a predetermined number of pixels;

means for extracting a set of features from each block to generate a feature vector for said block;

means for identifying each block using fuzzy rules as either a text-like image or a natural-like image dependent on said feature vector for said block;

memory for storing a plurality of identified blocks coupled to said identifying means;

means for generating said display signal at a lower data rate than said input video signal dependent upon said identified blocks, wherein a first region of said frame comprising a number of identified text-like blocks are generated differently from a second region of said frame comprising a number of identified natural-like image blocks.

BRIEF DESCRIPTION OF THE DRAWINGS

A small number of embodiments of the present invention are described with reference to the accompanying drawings, in which:

FIG. 15 is a mixed image comprising overlapping text and natural image regions;

DETAILED DESCRIPTION

Figure 1:
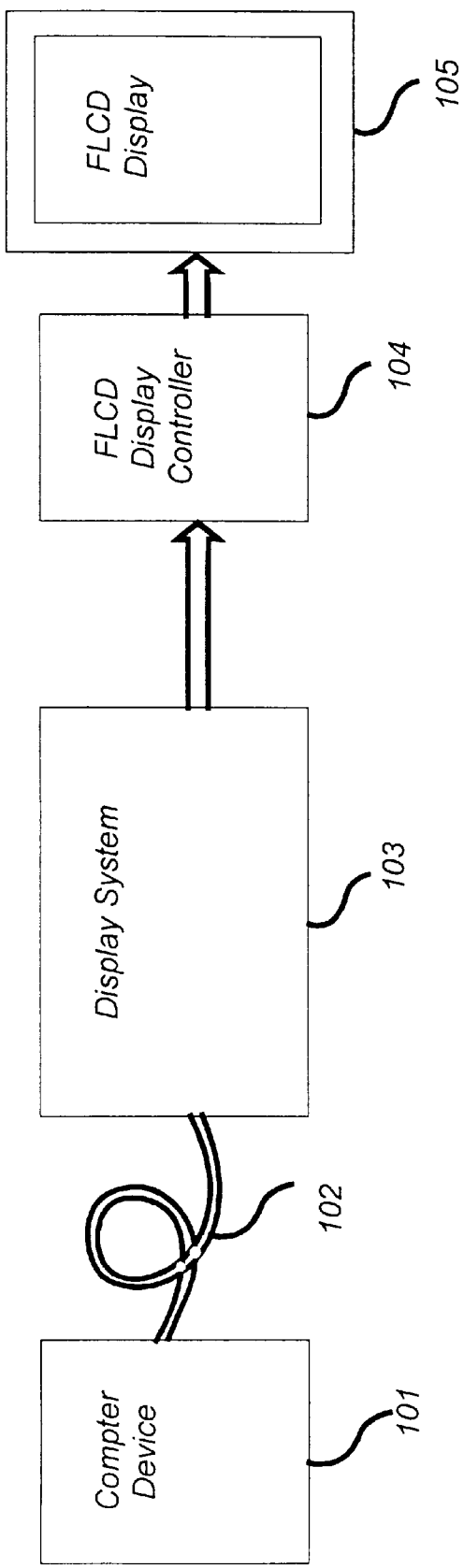
FIG. 1 is a schematic view of an overall display system with which the present invention may be practiced.

The present invention provides a method and apparatus of zone segmentation used to classify a display screen into different regions. This enables optimal halftoning/colouring, and partial updating methods to be applied to those regions so as to optimise display management and quality of reproduction.

In particular, the embodiments of the invention use a fuzzy classification technique to zone segment display signals. The specific task of the preferred and alternate embodiments is to segment an image into two types of regions: a first region for text and a second region for all other images including natural images. Rules are required that are adaptable for the specific image being displayed or a collection of images (eg. different pages) to be displayed. For example, a multi-page document might have a predetermined set of rules applied throughout the entire document. Alternatively, a multi-page document can have different rules applied to different pages depending on the contents of each page.

The approach used for zone segmentation according to the present invention assumes that individual pixels, and their relation to their neighbours, are described completely by a set of features. Further, different components in a given image differ in either gray-level (colour), or texture, or both. Accordingly, the zone segmentation according to the embodiments of the present invention comprises two important aspects: feature extraction, followed by segmentation. Importantly, feature sets are identified that are suitable for distinguishing text from natural image zones and which are suitable for hardware implementation.

The hardware implementation preferably takes the form of an application specific integrated circuit (ASIC) that can be practiced in the display system 203 of FIG. 2, described hereinafter. However, in view of the following description of the preferred and alternate embodiments, it will be apparent to persons skilled in the art that other embodiments of the invention may be carried out without departing from the scope and spirit of the present invention.

Feature selection refers to the problem of dimensionally reducing image data that initially contains a high number of features (or visual characteristics). It is desired to choose optimal subsets of the original features that retain the information essential for computerised detection of substructures in the image data, while reducing the computational burden imposed by using many features.

By performing feature extraction, the computational complexity for pattern classification can be reduced by dealing with the image data in a lower dimensional space. Further, estimates of the class-conditional density functions can be obtained for a given number of training samples of image data. Thus, decision rules to be used on working images can be obtained.

Whether or not a decision rule actually performs better than another rule applied in an observation space depends upon how much information is lost in the feature transformation. In some cases, features may be derived that sacrifice none of the information needed for classification.

There are many ways to derive features for images. In the preferred embodiment, the feature set comprises spatial domain features. In the alternate embodiment, a linear transformation is applied to blocks of die image. Preferably, a wavelet transform is applied in the alternate embodiment to derive the feature set. However, other transforms including Hadamard and Fourier transforms, for example, may optionally be applied.

The characteristics of text and natural image classes overlap. Conventional (prior art) approaches exploiting crisp thresholding techniques are not sufficiently powerful for zone segmentation due to the lack of an effective way to define the boundaries between the two classes (eg., text and natural) of images.

The embodiments of the present invention use a fuzzy classification technique to provide a way to deal with fuzziness in image data. Such a technique assumes the boundary between two neighbour classes to be a continuous, overlapping area within which an object has partial membership of each class. This viewpoint reflects the reality of poorly defined boundaries between categories in zone segmentation.

The fuzzy rule-based method of the preferred and alternate embodiments addresses the ambiguity in the transitional regions to achieve a human-like performance. The specific method performed is composed of two principal phases.

The first principal phase is a training phase where all samples of the training set are labelled and a set of features calculated. The fuzzy rules are then generated based on the training set. In this connection, the goal of a rule-based method is to perform image segmentation using rules based on labels, such as small (S), medium (M), and large (L). A rule is usually in the form:

IF (a set of conditions are satisfied) THEN (a set of consequences can be inferred).

Thus, a fuzzy rule is one in which the antecedents and the consequents are associated with fuzzy concepts (such as terms with membership functions).

The second principal phase is a run phase where the features are calculated for each testing block (the specific image block being determined), and a decision is made whether the input (image) block belongs to object 1 (text) or object 2 (natural image) according to the rules generated in the training phase. In the following description, the term "block" is used to described groups of pixels having a predetermine size (e.g., 9×9 pixels). Alternatively, such blocks may be referred to as "tiles" or "segments".

Figures 5A, 5B:
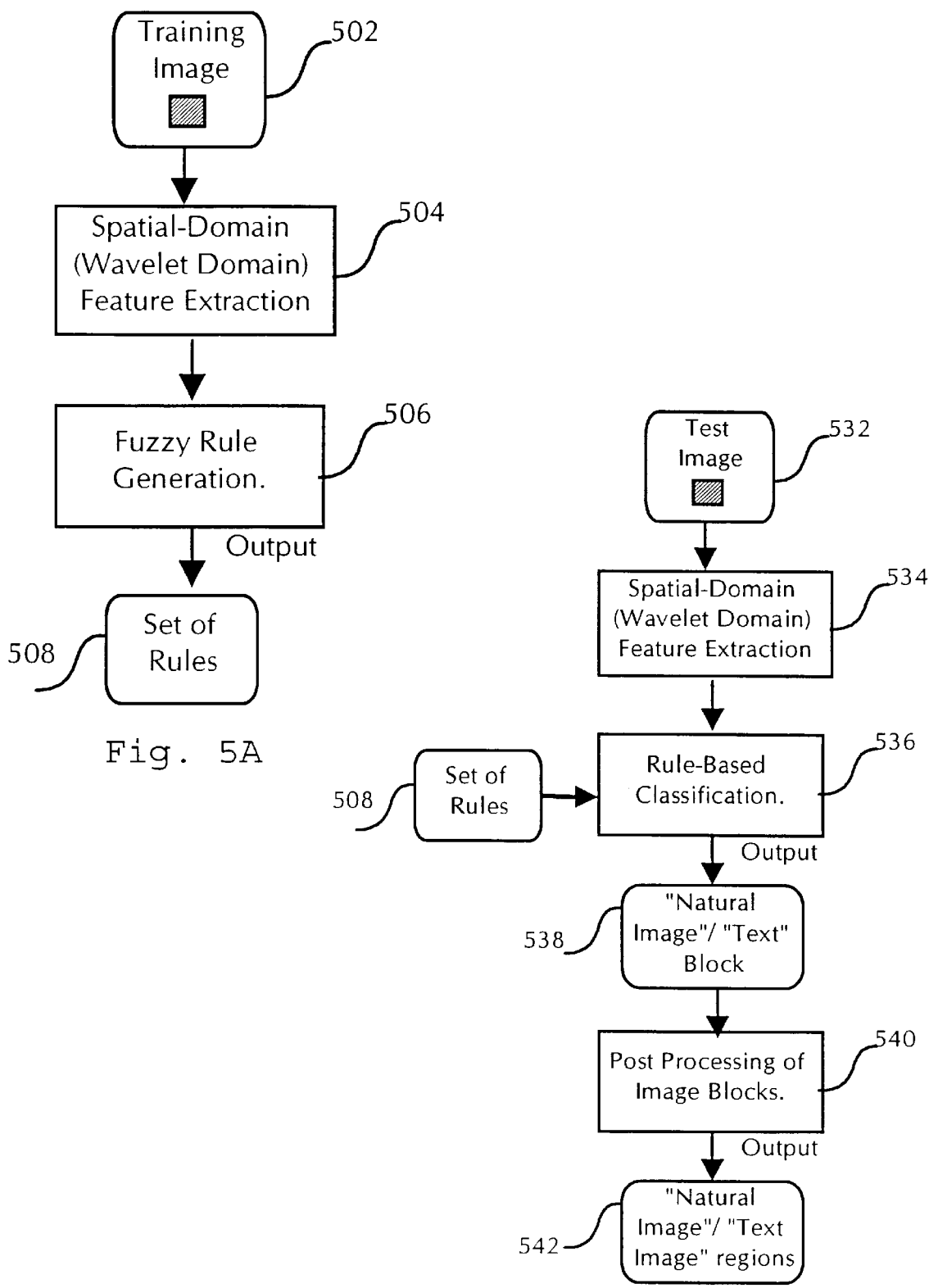
FIGS. 5A and 5B are high-level flow diagrams illustrating the training and run phases, respectively, of the rule-based zone segmentation according to the preferred embodiment (alternate embodiment)

FIGS. 5A and 5B are high-level flow diagrams illustrating the training and run phases according to the preferred and alternate embodiments. In FIG. 5A, a training image 502 is processed on a block-by-block basis, where each block consists of a predetermined number of pixels. In step 504, extraction of spatial domain features is carried out on each block of the training image 502 according to the preferred embodiment. As indicated by parenthesis, in the alternate embodiment, wavelet domain features are extracted from each block. In step 506, using the extracted features, fuzzy rules are generated to be used in classifying blocks as either natural images or text images. The output of step 506 is a set of fuzzy rules 508.

FIG. 5B is a high-level flow diagram illustrating the run phase of the rule-based segmentation method according to the preferred embodiment. A test image 532 is processed on a block-by-block basis, where again each block has a predetermined size. In step 534, extraction of spatial domain features is carried out. In the alternate embodiment, wavelet domain features are extracted. In step 536, rule-based classification is carried out on the extracted features of each block from step 534. In this connection, a set of fuzzy rules are provided to step 536 to implement the rule-based classification. The output of step 536 for each block is an indication 538 that the block is either a natural image or a text image. Optionally, the run-phase method may further comprise the step 540 of post processing blocks of the test image to compensate or correct mis-classifications of individual blocks of the image. The output of optional step 540 is one or more natural image or text image regions 542.

Before describing the zone segmentation unit of the embodiments of the invention in further detail, a brief description of a display system incorporating the zone segmentation unit is set forth.

Overall Display System Configuration

FIG. 1 illustrates schematically a display system 103 that is connected between a device 101 and a display controller 104. In turn, the display controller 104 is connected to a display 105. As is described below, the zone segmentation unit according to the preferred embodiment is implemented in the display system 103.

The display system 103 is shown configured for receiving an image output from a device 101, such as a computer, via a cable 102. The image is preferably provided in the form of separate color channels of red, green and blue image information, as well as synchronization information. However, other color models including YIQ, HSV, HLS, and LAB may be practiced.

In the preferred embodiment, the display system 103 is used in combination with a ferro-electric liquid crystal display (FLCD) and corresponding FLCD display controller. The image is displayed on the display device 105, which has a lower frame rate than that expected by the device 101, via the display controller 104. However, it will be readily understood by a person skilled in the art that while the preferred embodiment is practised using an FLCD display and FLCD display controller, the present invention is not limited to applications of those devices, but can be applied in numerous other areas including color reproduction devices, general image rendering techniques, and other types of display systems.

Display System Incorporating Fuzzy-Rule-Based Zone Segmentation

Figure 2:
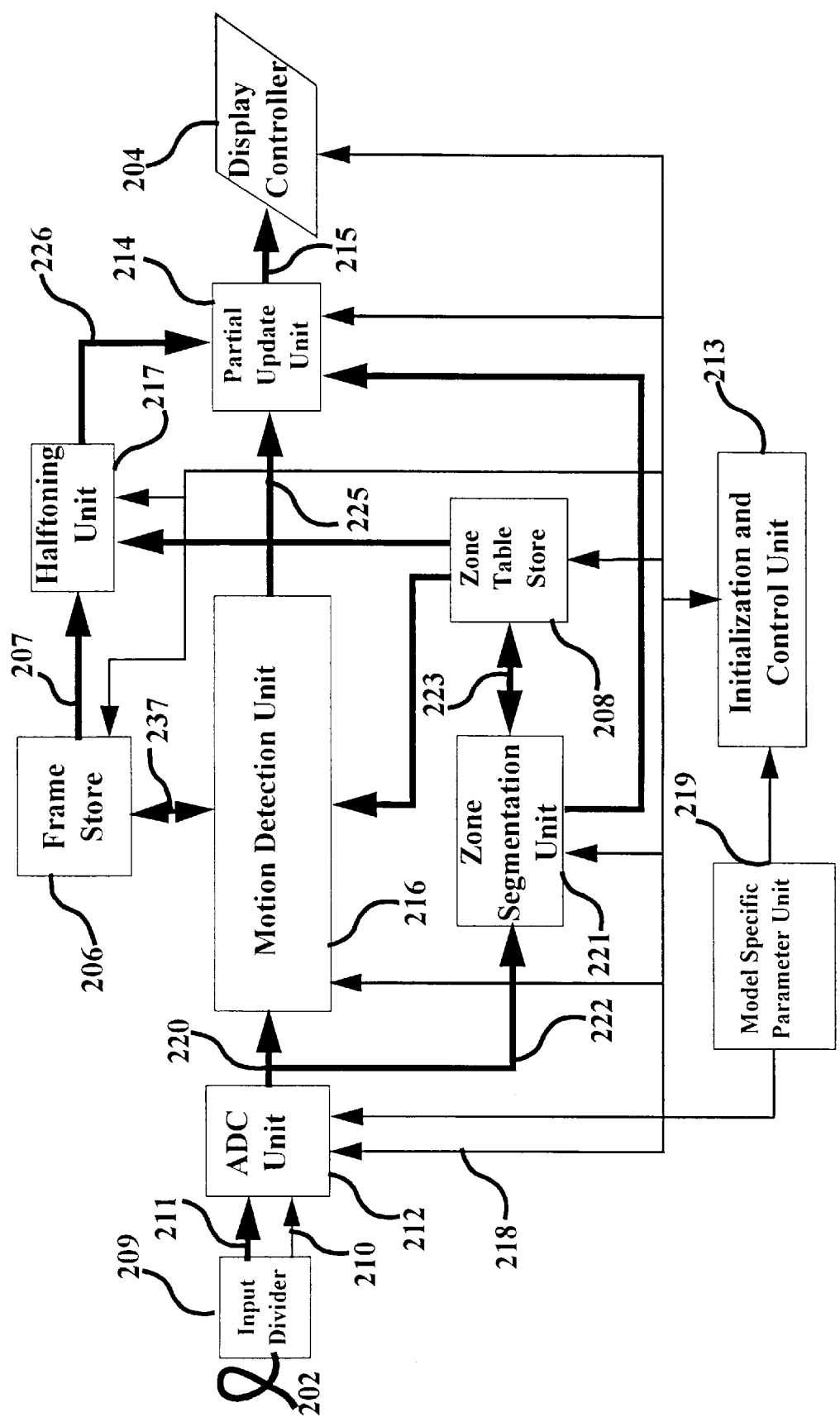
FIG. 2 is a schematic view of the display system 103 of FIG. 1 including the zone segmentation unit according to the preferred embodiment.

A display system 103 in which the zone segmentation unit can be practiced is illustrated in FIG. 2. In the following description, numerous specific details are set forth to provide a more thorough description of the present invention. It will be apparent to one skilled in the art that the present invention may be practiced without these specific details. In other instances, well-known features have not been described in detail so as not to obscure the invention.

The display system 103 comprises a zone segmentation unit 221 according to the preferred embodiment, a zone table store 208, a frame store 206, a halftoning unit 217, and a partial update (PU) unit 214. It also comprises an input divider, an analogue-to-digital conversion unit 212, a motion detection unit 216, a model specific parameter unit 219, an initialisation and control unit 213 and a display controller 204 corresponding to the FLCD display controller 104 of FIG. 1.

The analogue input is provided to the display system 103 by means of the cable 202 (corresponding to the cable 102 of FIG. 1). The synchronization information of the analogue input is divided, or separated, from the color information by an input divider 209. The color information 211 and synchronization information 210 are then forwarded to an analogue-to-digital conversion (ADC) unit 212. The red, green and blue analogue input channels 211 from the divider 209 are fed to three analogue-to-digital (A/D) converters (not shown) in the analogue-to-digital (A/D) conversion unit 212. Each A/D converter converts its analogue channel input information to a corresponding digital value.

The synchronisation, or control, information 210,211 is also fed to the analogue-to-digital conversion unit 212, and is decoded and digitized to produce system control information such as pixel clock (PCLK), line retrace, and frame retrace signals (not shown separately).

The control information is output with the pixel color information in addition to being supplied to the remainder of the display system 203 via a bi-directional control channel 218. The control channel 218 couples these signals to various portions of the overall system 103 including the initialization and control unit 213, the zone segmentation unit 221 according to the preferred embodiment, the halftoning unit 217, the zone table store 208, the partial updater unit 214, the frame store 206, the motion detection unit 216, and the display controller 204. The initialization and control unit 213 is preferably inplemented using a microprocessor.

The analogue-to-digital conversion unit 212 utilises model specific parameters, crystal timing input information, and input control synchronization information, as well as the three analogue input channels, to produce the corresponding binary output pixels for each input pixel at the pixel clock rate determined by the model specific parameters. These parameters are stored in a storage device 219 and are preferably loaded into the analogue-to-digital conversion unit 212 at start-up time by the initialization and control unit 213. The model specific parameter unit 219 is preferably a serial EEPROM.

As an alternative to an analogue input, the cable 202 can convey an input signal in a digital format directly to an input buffer (not illustrated but known in the art) that may substitute for the analogue-to-digital conversion unit 212.

For a single display system 103 to be connected to a multitude of different computer systems, the cable assembly 202 is preferably fitted with a mode specific crystal and/or die initialization and control unit 213 loads from the storage device 219 model specific parameters into the display system controllers at start-up time. Model specific parameters that tend to vary from system to system include the frequency of the pixel output clock of the computer device 101, the number of pixels per line, the number of lines per frame, horizontal blanking time, vertical blanking time, analogue-to-digital gain and offset parameters, and the like. These parameters can then be stored in the cable 202 with different cables being available for different computer devices 101, thereby increasing the versatility and utility of the display system 203.

The number of bits and hence the resolution with which digital values are output from the analogue-to-digital conversion unit 212, varies according to factors such as the cost and speed of the A/D converters used. In this embodiment, each A/D converter of the analogue-to-digital conversion unit 212 outputs eight bits of information for its respective input color on an A/D output bus 220. Hence, the A/D output bus 220 is at least 24 bits wide, representing a single pixel of display information. Additionally, the analogue-to-digital conversion unit 212 outputs pixel clocks, frame and other synchronization information on the A/D output bus 220.

The typical analogue input rate to the display system 103 is 60 Hz, while a screen update rate of the display device 105 is of the order of 15 Hz. Consequently, the pixel display information provided by A/D bus 220 output is fed to the frame buffer or store 206 through the motion detection unit 216. The output 207 of the frame store 206 is coupled to halftoning unit 217, which applies halftoning to the frame. The output 225 of the motion detection unit 216 and the output 210 of the halftoning unit 217 are coupled to the partial updater (PU) 214, which carries out the partial updating of the image frame. The output 215 of the partial updater 214 is coupled to the display controller 214. Substantially that pixel display information of a current frame that has changed from a previous frame is updated on the display device 105. Thus, the screen update rate is reduced.

The zone segmentation unit 221 according to the preferred embodiment receives pixel display information 222 from the A/D output bus 220. The zone segmentation unit 221 determines a zone type for each of a plurality of regions within a frame of an input image sequence, where regions of the input image comprise a predetermined image format. In particular, the zone segmentation unit 221 segments an input image into regions that contain substantially "text characters" or "natural image" (ie. other than "text characters"). The zone type, for example, is represented by at least a one-bit identifier; a zero (0) bit indicates that a region of the image segmented by the zone segmentation unit 221 is a "natural image", and a one (1) bit indicates the region is substantially "text characters".

In the embodiment of FIG. 2, the zone segmentation unit 221 is adapted to determine a set of coordinates of the regions relative to the whole input image in addition to the zone type for each of the plurality of regions. The set of coordinates and zone type are communicated by the zone segmentation unit 221 to the partial updater 214, which may preferably force the update of large regions of motion.

A zone table store 208 is coupled to zone segmentation 221 and is provided to store the set of coordinates and zone type for each of the plurality of regions of the input image. The zone table store 208 is a random access memory (RAM) device which is constantly updated, or written to and read from, by the zone segmentation unit 221 via a bidirectional data bus 223.

The zone table store 208 also provides information to the motion detection unit 216 and the half-toning unit 217, which benefit from an advanced knowledge of the zone type and coordinate position of a region of input image being processed by the respective units (216,217). The zone segmentation unit according to the preferred embodiment is hereinafter described in greater detail.

fuzzy rules for classification. In step 608, a first block of the image is selected for processing.

In decision block 610, a check is made to determine if all of the blocks have been processed. If decision block 610 returns true (yes) processing terminates at step 620. At this stage, the finalised fuzzy rules for classification are output. If decision block 610 returns false (no), processing continues at step 612. In step 612, a set of features is extracted from the current block. In step 614, a feature vector for the block is generated based upon the extracted features. In step 616, the feature vector is used to generate the fuzzy rules for classification. In step 618, the next block of the image is selected for processing. Processing then continues at decision block 610.

As noted above, the preferred embodiment utilises features derived directly from the spatial domain and thus operates directly on die image pixels. The set of spatial domain features listed in Table 1 can be applied within a segment or block of the image. The features have been found to be advantageously suitable for zone segmentation.

TABLE 1

| Feature | Descriptions | Symbol |
|---|---|---|
| 1 | mean gray level in block | MI |
| 2 | gray-level variance (or standard deviation) in the block | SI |
| 3 | absolute value of the gradient | G |
| 4 | mean absolute value of the on-zero gradient in the block | MG |
| 5 | maximum absolute value of the non-zero gradient in the block | GG |
| 6 | standard deviation of the absolute value of the on-zero gradient in the block | SG |
| 7 | absolute value of local contrast | C |
| 8 | mean of the absolute value of non-zero local contrast | MC |
| 9 | maximum absolute value of the non-zero local contrast in the block | CC |
| 10 | standard deviation of the absolute value of the non-zero contrast in the block | SC |
| 11 | contrast of a darker pixel against its background | CB |
| 12 | dominant local orientation | DO |
| 13 | number of gray levels within the block | NG |
| 14 | number of pixels in the block with maximum gray level in block | P |
| 15 | number of pixels in the block with gray level larger than mean gray level in block | NL |
| 16 | number of pixels in block with gray level smaller than mean gray level in block | NS |
| 17 | directional gradients | x,y, 45° and 135° |
| 18 | transform domain features | FFT, Haar, DCT, Hadamard |
| 20 | x,y direction projections | |

Rule-Based Zone Segmentation Using Spatial Domain Features

Figure 6:
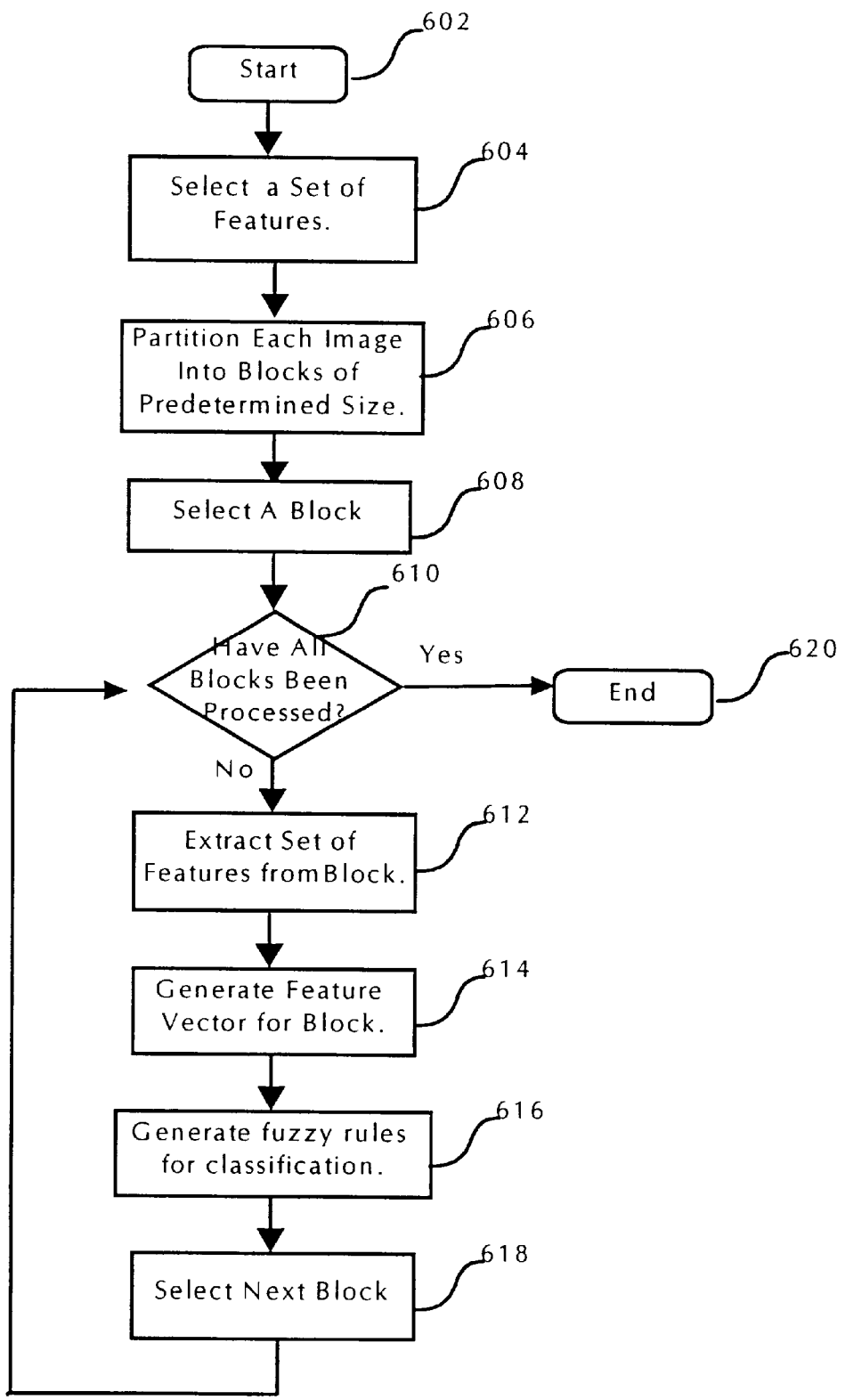
FIG. 6 is a flow diagram illustrating in greater detail the training phase of the zone segmentation method according to the preferred embodiments.

As discussed above, the zone segmentation technique is a two phase process. FIG. 6 is a flow diagram illustrating in greater detail the training phase of the zone segmentation technique. Processing starts in step 602. In step 604, a set of features is selected to be used in generating the fuzzy classification rules. In step 606, an image is partitioned into blocks of predetermined size for processing. While the following description is in terms of a single image, a number of images are in fact used to train the system to generate the The features in Table 1 are derived based on gray-level images. For colour images, the intensity of the image is used, as defined in Equation 1:

$$I(x,y)=0.299R(x,y)+0.587G(x,y)+0.114B(x,y). \quad (1)$$

Spatial domain feature analysis requires the determination of a number of different features. For example, gradient (feature 17) as referred to in Table 1 is calculated as follows:

$$G(x,y)=|I(x,y) \otimes S_x(x,y)|+|I(x,y) \otimes S_y(x,y)|, \quad (2)$$

where the Sobel operators are defined as follows:

$$S_x(x, y) = \begin{bmatrix} -1 & 0 & 1 \\ -2 & 0 & 2 \\ -1 & 0 & 1 \end{bmatrix} \text{ and } S_y(x, y) = \begin{bmatrix} 1 & 2 & 1 \\ 0 & 0 & 0 \\ -1 & -2 & -1 \end{bmatrix}. \quad (3)$$

Local contrast is defined as the contrast of a pixel compared with that of its neighbours as follows:

$$C(x,y) = \frac{1}{4}[I((x-\delta),y) + I((x+\delta), y) + I(x, (y-\delta)) + I(x, (y+\delta))] - I(x,y), \quad (4)$$

where $\delta$ is the distance of a neighbour to the pixel under consideration.

The contrast $C(x,y)$ measures the difference between the intensity of the pixel and the average intensity of its four neighbours within a distance $\delta$ of the pixel. It becomes the Laplacian of $I(x, y)$ if $\delta=2$.

The detection probability attributes for a lumber of the features in Table 1 are listed in Table 2:

is assessed in terms of a number of features $f_1$ to $f_n$ 303 to calculate a feature vector for each block. Preferably, six feature components are used (as described below with reference to Table 3), although other numbers of features can be practiced without departing from the scope and spirit of the invention. The feature vectors are retained in a feature vector register 304. The output of the register 304 is provided to a rule classifier register 305 that outputs the specific rules to be applied to the image as a function of the degree of object membership. Preferably, following the fuzzy rule classification, a post-processing step is undertaken to merge the image blocks to image regions.

Figure 4A:
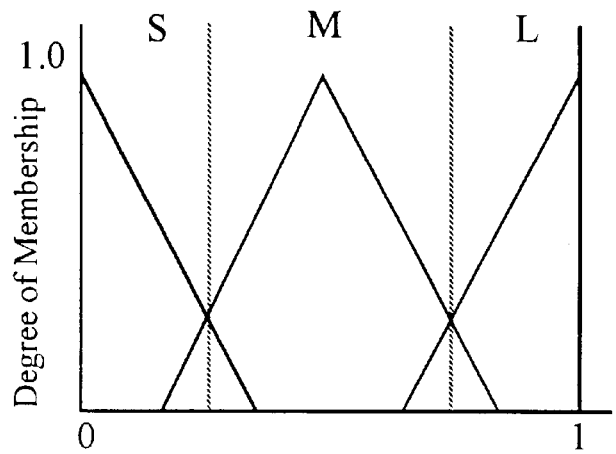
FIGS. 4A and 4B are graphs illustrating a one-dimensional, triangular membership function for three fuzzy regions and two fuzzy regions, respectively.
Figure 4B:
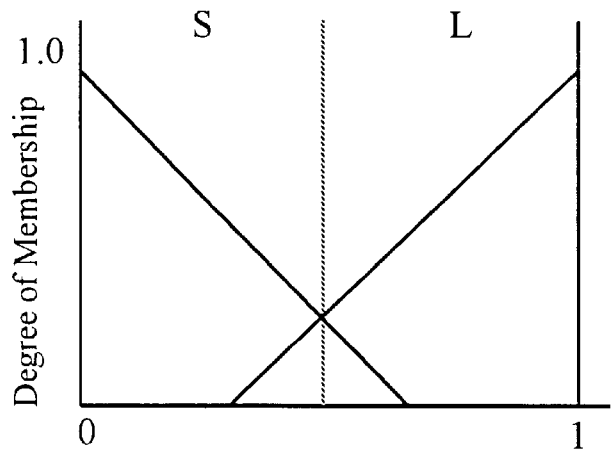

A uniformly distributed triangular membership function is chosen for fuzzy rule classification. FIGS. 4A and 4B illustrate one-dimensional membership functions with different fuzzy regions. FIG. 4A illustrates three fuzzy regions with three membership functions for the labels S, M and L (small, medium, and large) for a feature value ranging inclusively between 0 and 1. In contrast, FIG. 4B illustrates only two fuzzy regions with labels S and L.

TABLE 2

| Symbol | Description | Attribute/ text | Attribute/ natural | Comments |
|---|---|---|---|---|
| MI | mean gray-level within the block | N/A | N/A | merging block to region |
| SI | gray-level variance within the block | high | low | detecting constant block |
| G | absolute value of the gradient | high | low | thresholding needed |
| MG | mean value of the non-zero gradient in the block | high | low | no thresholding |
| SG | standard deviation of the non-zero gradient in the block | high | low | no thresholding |
| C | absolute value of local contrast | high | low | thresholding needed |
| MC | mean value of the non-zero contrast in the block | high | low | true for thin text lines |
| SC | staudard deviation of the non-zero contrast in the block | high | low | no thresholding |
| CB | contrast of a darker pixel against its background | high | low | for text darker than surrounding |
| DO | dominant local orientation | high | low | oriented tiles |
| NG | number of gray levels within the block | low | high | |
| P | number of pixels in the block with maximum gray level in block | high | low | |

With reference to Table 2, some of the features provide a high text attribute value (or result) and a corresponding low natural image attribute value. Interestingly, only one feature in Table 2 provides a high natural image attribute value and a low text attribute value.

A block-based (tiled) approach to image segmentation is used in which each image, such as a training and testing image, is firstly divided into segments or regions such as equally sized blocks, and each block is treated as input data. Square blocks may be used ranging between 4×4 to 32×32 pixels per block. Preferably, a block of 9×9 is used to achieve sufficient complexity in any one block and yet maintain the number of blocks in any one image within manageable proportions. However, other block shapes call be used without departing from the scope and spirit of the invention.

Having divided the image into blocks, the set of features of Table 2 are extracted from the data in each block.

Figure 3:
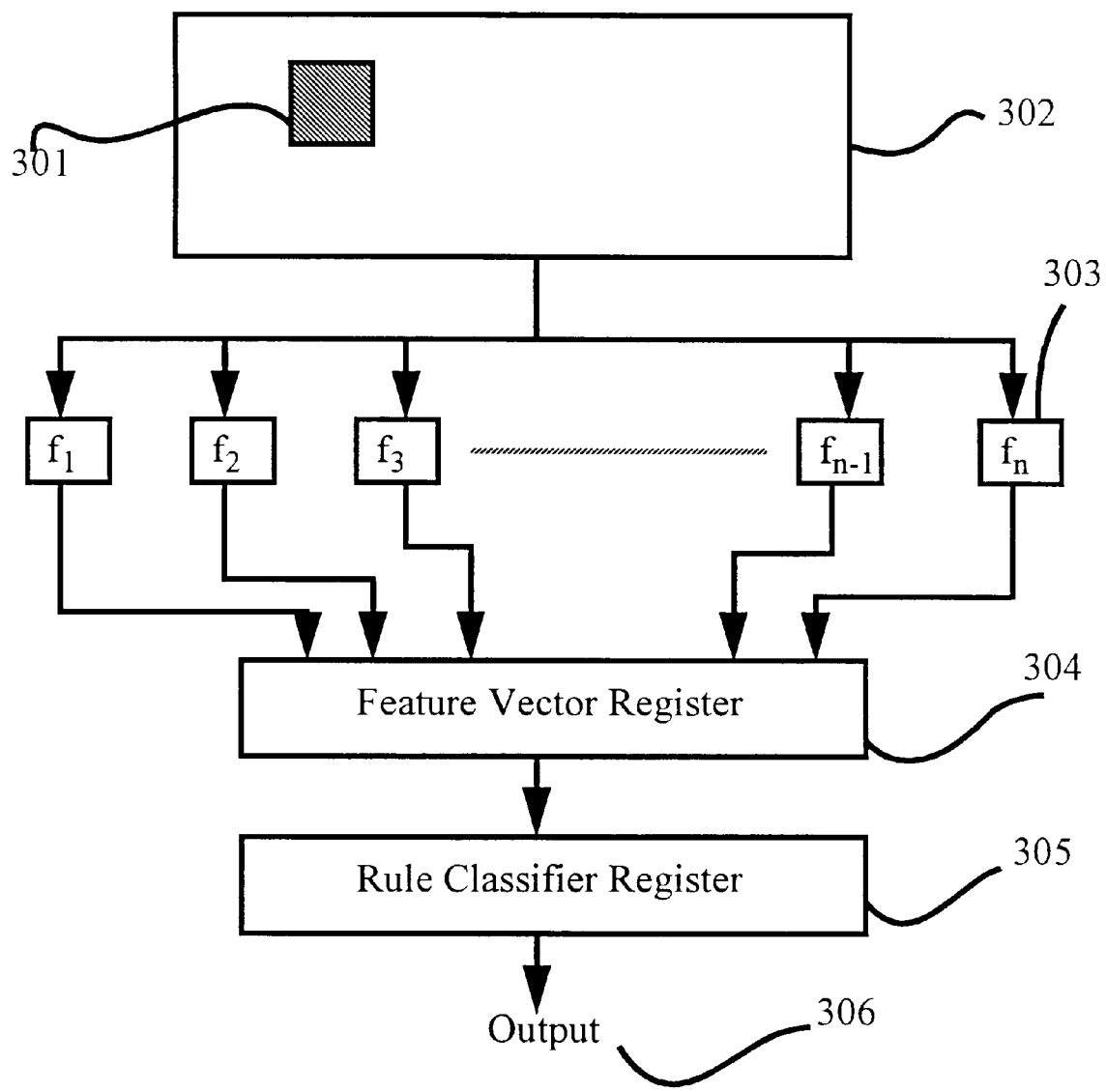
FIG. 3 is a schematic block diagram of the architecture for a fuzzy rule-based zone segmentation used in the preferred embodiment.

FIG. 3 illustrates a processor architecture configured to perform the rule-based zone segmentation according to the preferred embodiment. An image 302 is input and divided into a number of image blocks 301. Each image block 301

Figure 8:
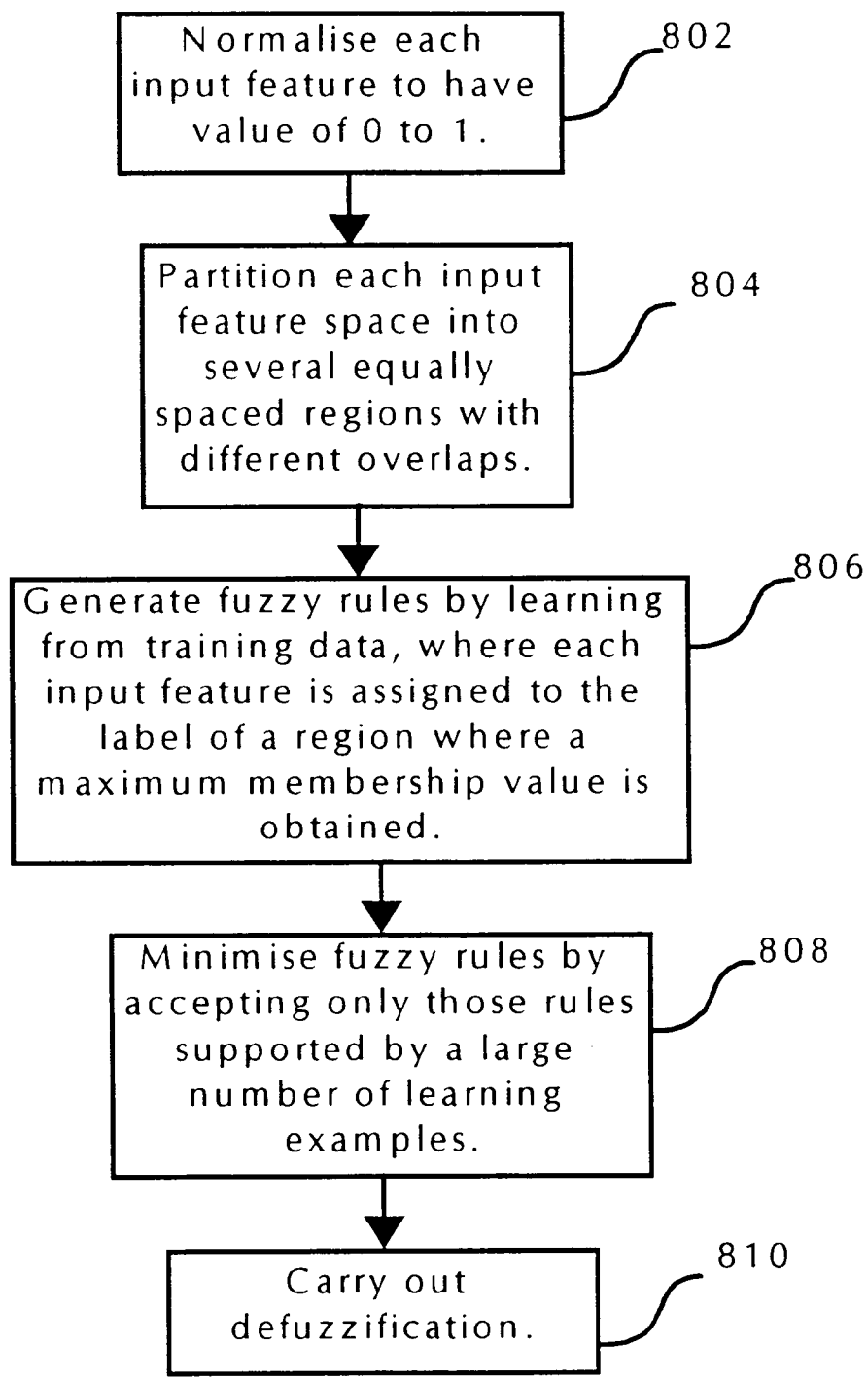
FIG. 8 is a detailed flow diagram illustrating the process of generating fuzzy rules for classification of blocks.

Fuzzy rule generation is illustrated in greater detail in FIG. 8. In step 802, each input feature vector is normalised to have a value ranging from 0 to 1. In step 804, each input feature space is partitioned into several equally spaced regions with different overlaps. In step 806, fuzzy rules are generated by learning from the training data. Each input feature is assigned to the label of a region where a maximum membership value is obtained. In step 808, the fuzzy rules are minimised by accepting only those rules supported by a large number of learning examples. In step 810, centroid defuzzification is applied in the defuzzification please. The output $O_p$ of the centroid defuzzification for the pth input pattern is determined by:

$$O_p = \frac{\sum_{i=1}^{K} D_p^i O^i}{\sum_{i=1}^{K} D_p^i}, \quad (5)$$

where K is the number of rules, $O^i$ is the class generated by rule i, and $D_p^i$ measures how the pth pattern fits the IF condition of the ith rule.

The measure $D^i_p$ is given by the product of membership values of the feature vector for the labels used in the ith rule:

$$D^i_p = \prod_{j=1}^{n} m_{ji}, \quad (6)$$

where n is the number of features and $m_{ji}$ is the membership value of feature j for the labels that the ith rule uses.

By assigning "0" to a text image block and "1" to a natural scene image block, an input pattern (an image block) is classified as a text image block if its output $O_p<0.5$. Otherwise, the block is classified as a natural image block.

For example, the pth input pattern has a feature vector (0.0, 0.1, 0.25, 0.3, 0.2, 0.85). The membership value for labels used by Rule 1 (in Table 4) are $m_{11}=1.0$, $m_{21}=0.733$, $m_{31}=0.333$, $m_{41}=0.2$, $m_{51}=0.4667$, $m_{61}=0.6$. The membership value for labels used by Rule 16 are $m_{1,16}=1.0$, $m_{2,16}=0.733$, $m_{3,16}=0.333$, $m_{4,16}=0.2$, $m_{5,16}=0.4667$, $m_{6,16}=0.067$. The pattern fit is given as follows:

$$D_p^1 = 1.0 \times 0.733 \times 0.333 \times 0.2 \times 0.4667 \times 0.7 = 0.0137. \quad (7)$$

and $$D_p^{16} = 1.0 \times 0.733 \times 0.333 \times 0.2 \times 0.4667 \times 0.067 = 0.0015. \quad (8)$$

Based on Rules 1 and 16 only, the pth input pattern has $$O_p = \frac{0.0137 \times 0 + 0.0015 \times 1}{0.0137 + 0.0015} = 0.099. \quad (9)$$

Since $O_p<0.5$, the pth input is assigned to text. This indicates that an input pattern (image block) with feature vector of (0.0, 0.1, 0.25, 0.3, 0.2, 0.85) is classified as a text image block based on Rules 1 and 16 in Table 4.

The features used in the fuzzy rule-based system of the preferred embodiment are shown in Table 3:

TABLE 3

| Index | Description | Value Range | Number of regions and its labels |
|---|---|---|---|
| F1 | mean value of the non-zero pixel gradient (MG) | [0, 1] | (large, medium, small) |
| F2 | standard deviation of the non-zero pixel gradient (SG) | [0, 1] | (large, medium, small) |
| F3 | mean value of the non-zero local contrast (MC) | [0, 1] | (large. medium, small) |
| F4 | standard deviation of the non-zero local contrast (SC) | [0, 1] | (large, medium, small) |
| F5 | number of distinguish gray levels within the block (NG) | [0, 1] | (large, medium, small) or (large, small) |
| F6 | peak value of the block gray level histogram (P) | [0, 1] | (large, medium, small) or (large, small) |

To assess the performance of such a set of features, 1863 samples comprising 567 text blocks and 1296 natural image blocks have been extracted from eight training images. The training images consist of four text images of 64×64, 64×64, 64×64, and 128×128 pixels, and four "natural" images of 128×128 pixels each.

Figures 9A, 9B:
FIGS. 9A and 9B illustrate two training images comprising a text image and a natural image, respectively.

Two of the training images 902, 904 used are shown in FIGS. 9A and 9B, which respectively illustrate a text image 902 and a natural image 904. For those two images, 10748 samples have been taken comprising 3564 text blocks and 7184 natural image blocks for testing. By choosing three fuzzy regions as shown in FIG. 4A, in each feature domain, 56 rules have been generated from the training samples. By eliminating those rules that are supported by less than 10 training samples, twenty-five of the original 56 rules are retained and listed in Table 4.

TABLE 4

| | IF | | | | | | | No. of |
|---|---|---|---|---|---|---|---|---|
| Rule | F1 and | F2 and | F3 and | F4 and | F5 and | F6 and | THEN | support samples |
| 1 | S | S | S | S | S | L | TEXT | 160 |
| 2 | L | L | M | M | S | L | TEXT | 30 |
| 3 | M | M | M | M | S | L | TEXT | 33 |
| 4 | M | M | S | S | S | L | TEXT | 11 |
| 5 | L | M | M | M | S | L | TEXT | 59 |
| 6 | L | L | L | L | S | M | TEXT | 15 |
| 7 | L | M | M | L | S | L | TEXT | 46 |
| 8 | L | M | M | L | S | M | TEXT | 13 |
| 9 | L | L | M | L | S | M | TEXT | 10 |
| 10 | L | L | M | L | S | L | TEXT | 14 |
| 11 | L | M | M | S | S | L | TEXT | 15 |
| 12 | L | M | S | S | S | L | TEXT | 17 |
| 13 | M | M | M | S | S | L | TEXT | 22 |
| 14 | L | M | L | L | S | M | TEXT | 15 |
| 15 | S | S | S | S | M | S | NATURAL | 916 |
| 16 | S | S | S | S | S | M | NATURAL | 99 |
| 17 | S | S | S | S | L | S | NATURAL | 105 |
| 18 | S | S | S | S | S | S | NATURAL | 16 |
| 19 | S | M | M | S | L | S | NATURAL | 23 |
| 20 | S | M | M | S | M | S | NATURAL | 23 |
| 21 | S | M | S | S | M | S | NATURAL | 20 |
| 22 | S | M | S | S | L | S | NATURAL | 26 |
| 23 | S | S | S | S | M | M | NATURAL | 30 |
| 24 | S | M | S | S | S | M | TEXT | 13 |
| 25 | M | M | M | M | S | M | TEXT | 18 |

Table 4 provides 25 rules each comprising a logically ANDed combination of the six features of Table 3 to identify whether a portion of an image is either text or natural. For example, Rule 1 states that: (F1=S) AND (F2=S) AND (F3=S) AND (F4=S) AND (F5=S) AND (F6=L). If this condition is satisfied, the segmented block is identified as text.

Figure 7:
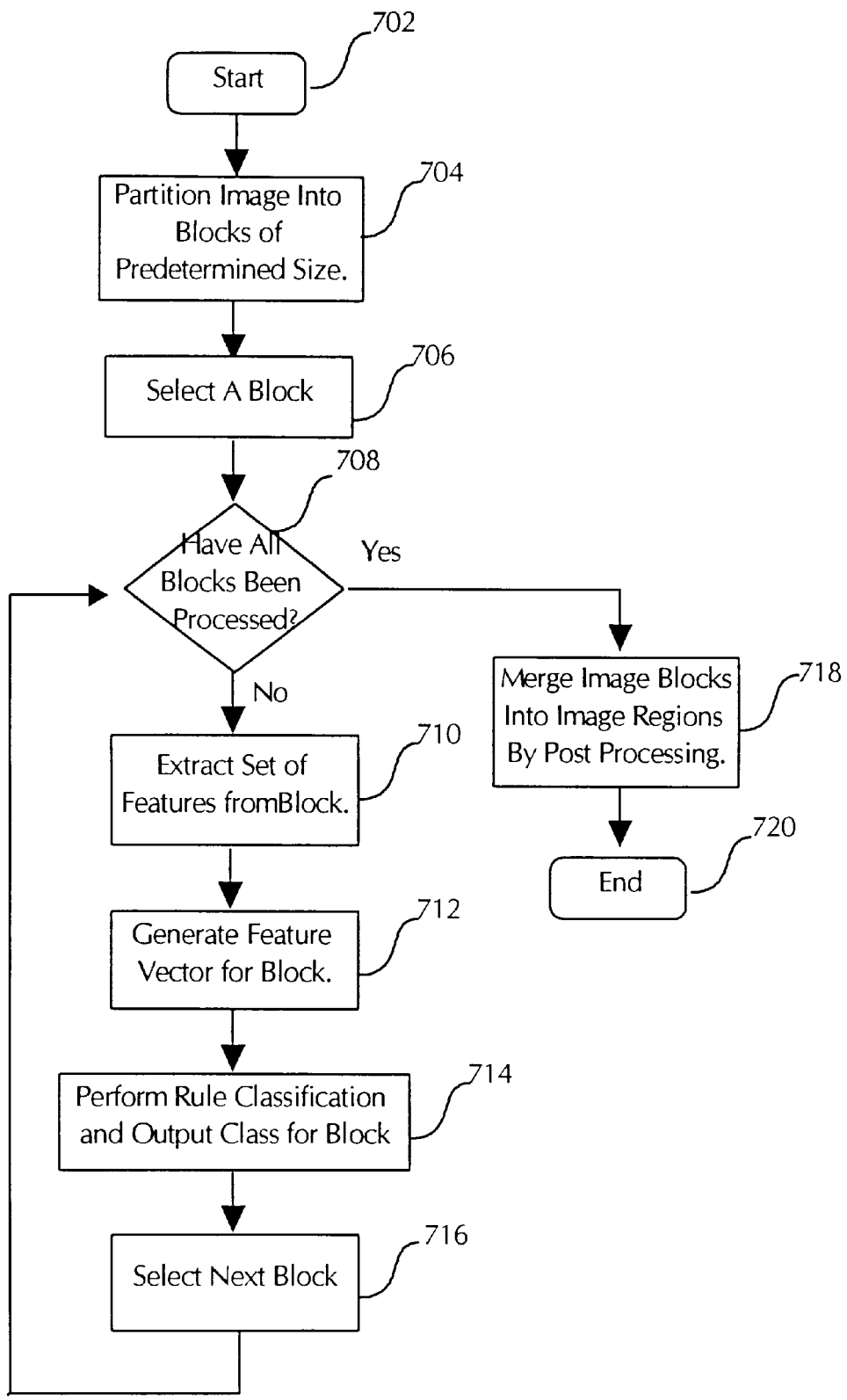
FIG. 7 is a flow diagram illustrating in greater detail the run phase of the zone segmentation method according to the preferred embodiments.

Reference is now made to FIG. 7 illustrating the run mode in greater detail. Processing starts at step 702. In step 704, an image is partitioned into a number of blocks having a predetermined size. In step 706, a first block is selected for processing.

In decision block 708, a check is made to determine if all of the blocks have been processed. When decision block 708 returns false (no), processing continues at step 710. In step 710, a set of features is extracted from the current block. In step 712, a feature vector is generated for the block using the extracted features. In step 714, rule classification is carried out on the feature vector and a class is determined for the block as either text or natural image. In step 716, the next block is selected and processing continues at decision block 708.

When decision block 708 returns true (yes), processing then preferably continues at step 718. In step 718, post processing is optionally carried out on the image blocks by merging the image blocks into image features where misclassifications of text and natural image blocks is corrected dependent upon neighbouring blocks in the image. This is described in greater detail below.

Table 5 indicates the performance measure for training and testing losing the rules listed in Table 4. Specifically, the success rate relates to the success rate for detecting, for example, text as text. The failure rate relates to the total number of unknown portions over the entire image.

TABLE 5

| image type | success rate for training | success rate for testing | failure rate |
|---|---|---|---|
| text | 99.826% | 99.523% | 6.37% |
| natural | 98.843% | 97.37% | 0.097% |

Optionally, by choosing three fuzzy regions (as shown in FIG. 4A) for the first four features listed in Table 3, and two fuzzy regions (as shown in FIG. 4B) for the last two features (F5 and F6), a total of 43 rules (being a second set of rules) are generated from the training samples. For the same image as used in Table 5, the performance measure using the second set of rules is shown in Table 6.

TABLE 6

| image type | success rate for training | success rate for testing | failure rate |
|---|---|---|---|
| text | 98.942% | 99.476% | 6.34% |
| natural | 95.293% | 91.80% | 0.445% |

Figure 10A:
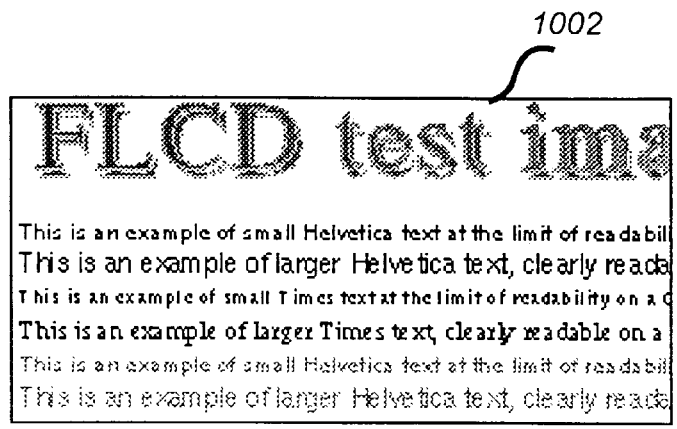
FIGS. 10A and 10B illustrate two test (run phase) images comprising a text image and a natural image, respectively.
Figure 10B:
Figure 11A:
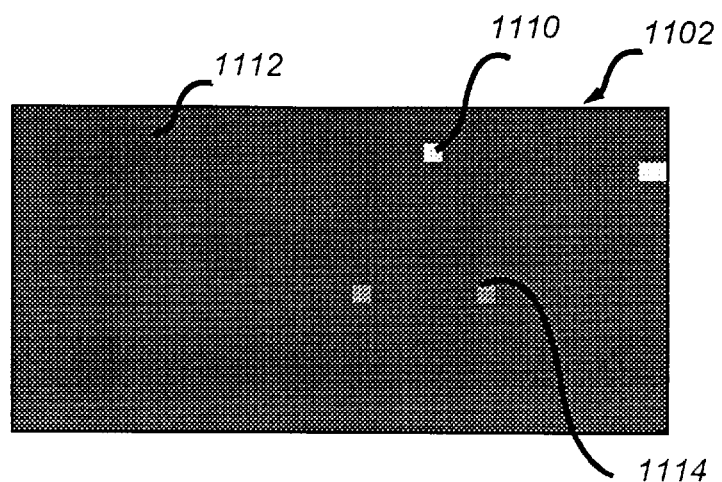
FIGS. 11A and 11B illustrate the zone segmentation results utilising the preferred embodiment for the test images of FIGS. 10A and 10B, respectively.
Figure 11B:
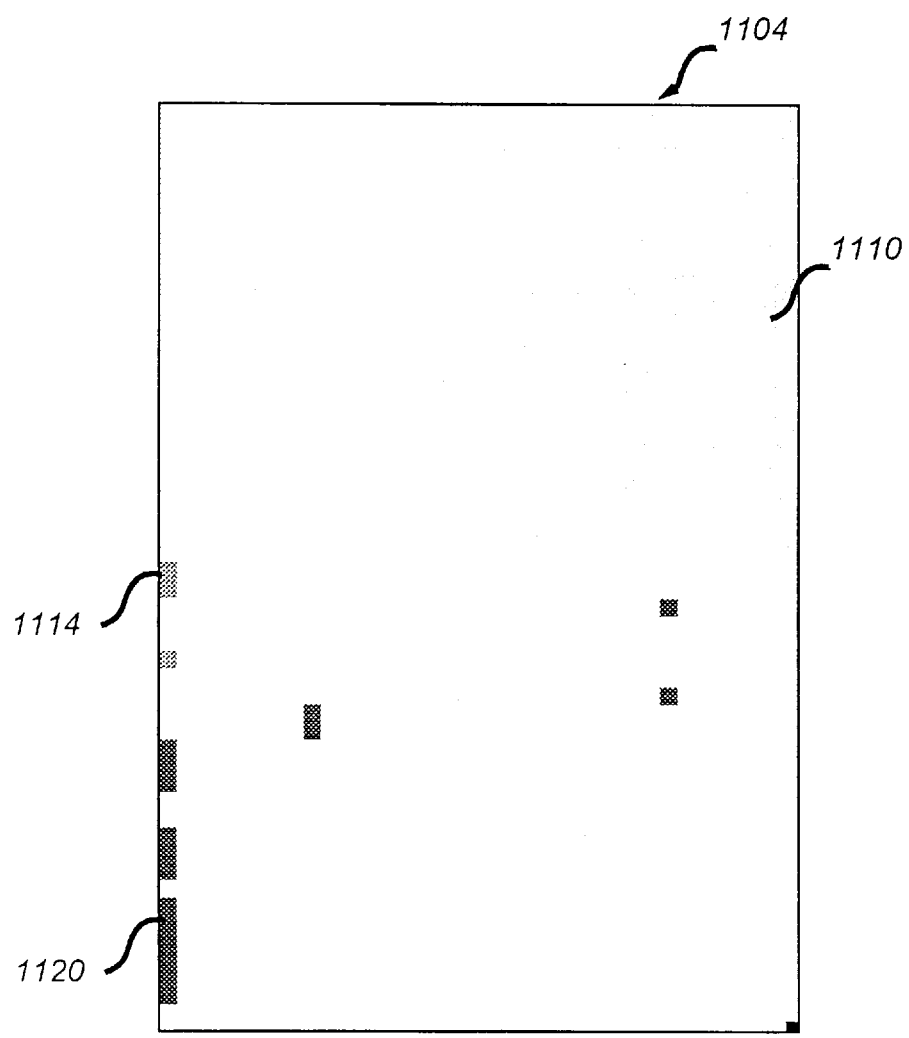

The performance of the preferred embodiment is illustrated by means of a comparison of FIGS. 10A and 10B with FIGS. 11A and 11B. FIGS. 10A and 10B show respectively a text image 1002 and a natural image 1004 being tested for detection purposes.

FIGS. 11A and 11B show respective segmentation results 1102, 1104 for the test images 1002, 1004 in which the results 1102, 1104 are shown in three shades of gray. In FIGS. 11A and 11B, a light shade 1110 is equivalent to a detected natural scene, the darkest shade 1112 is equivalent to a detected text image block, and a mid-gray shade 1114 is equivalent to a block indeterminate or unknown as either natural or text.

A qualitative indication of the performance of the preferred embodiment is indicated by comparing the lower left side edge of FIG. 10B, where the natural image includes a distinct black edge 1010, and FIG. 11B where the arrangement of the preferred embodiment has detected most of that edge 1120 as being text. The distinct transition seen in FIG. 10B is construed as being indicative of text. By contrast, other transitions within FIG. 10B, such as at the hairline of the model, is detected as being a natural image. Corresponding results can be qualitatively determined by a visual inspection and comparison of FIGS. 10A and 11A.

It will be apparent from the foregoing that by determining detection rules in all offline manner using test images, a fuzzy rule-based method for text/natural image detection can be determined and readily implemented.

Rule-Based Zone Segmentation Using Wavelet Transformations

In the alternate embodiment of the invention, the wavelet transform is preferably used for mixed image (i.e., image consists of text and nature image regions) analysis for feature extraction/analysis in relation to zone segmentation. The discrete wavelet transform (DWT) represents a multi-resolution analysis in the form of coefficient matrices that can be used in a manner similar to Fourier series coefficients. This DWT representation performs feature extraction on the original image. As referred to above, other linear transforms including Hadamard and Fourier transforms may optionally be practiced to derive frequency domain features.

In the alternate embodiment, a block-based wavelet transform is performed using Standard and Non-Standard 2D decompositions as a feature extractor preceding a fuzzy rule-based system. A standard 2D composition involves carrying out the decomposition on a column-by-column basis, followed by a row-by-row basis, or vice versa. The non-standard 2D composition involves carrying out the decomposition on both a row and a column basis, that is, in a 2D manner. The alternate embodiment of the invention optionally employs Haar and Daubechies' wavelet filters with four taps D4 and eight taps D8. However, other possible wavelet bases may be optionally employed.

Figure 12:
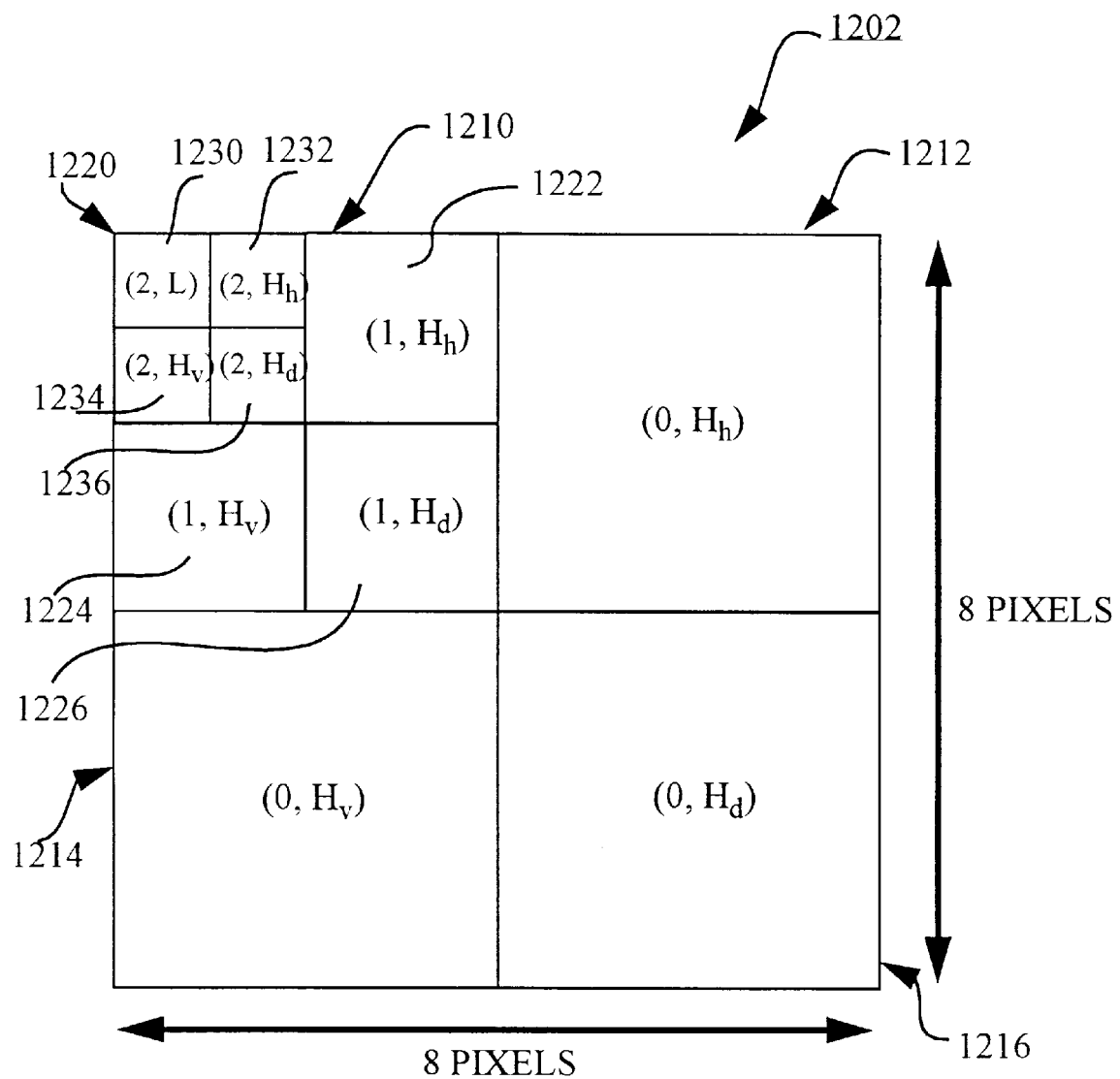
FIG. 12 illustrates a decomposition of a block of pixels of an image obtained using a wavelet transformation.
Figure 13:
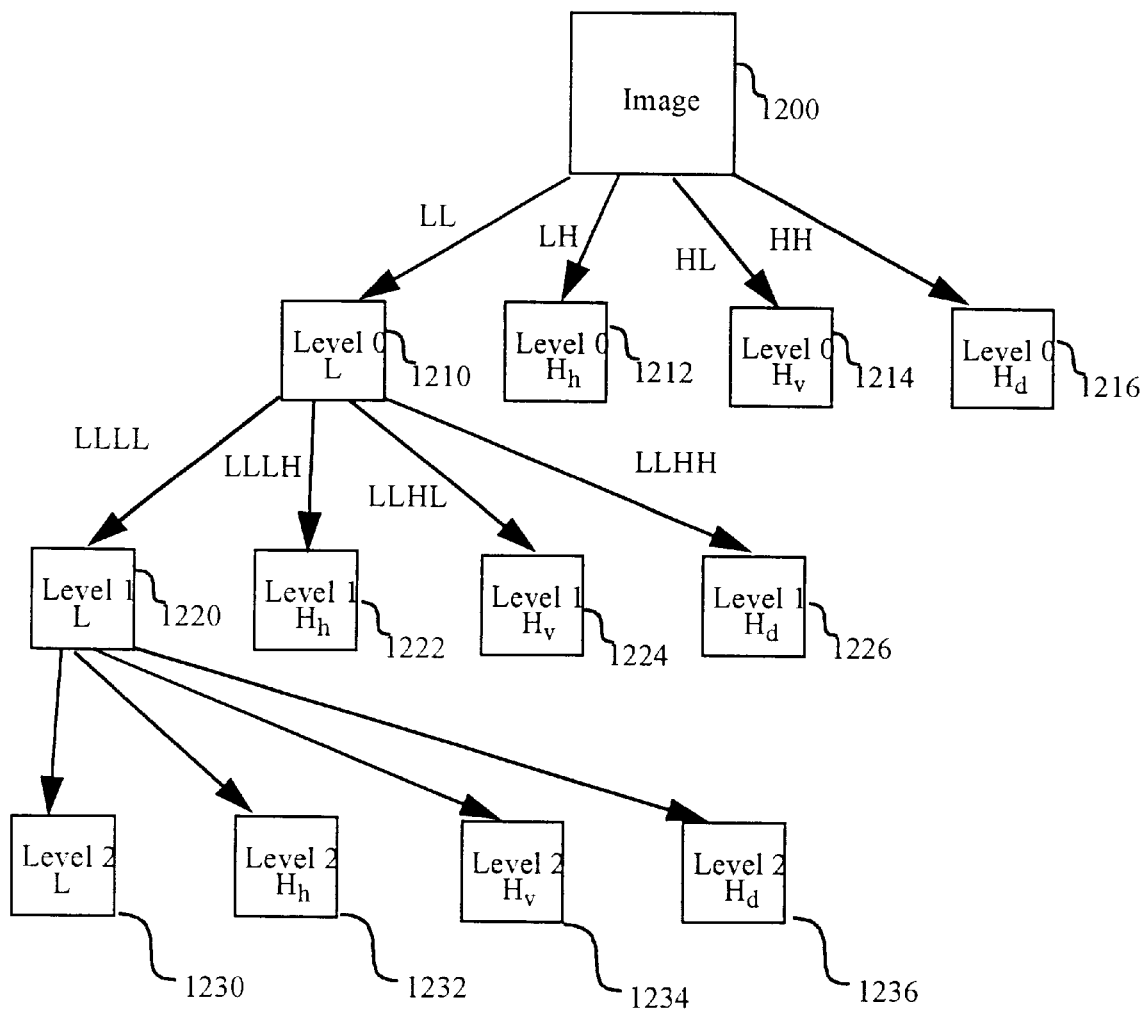
FIG. 13 illustrates the pyramidal structure of the subbands of each level of the decomposition of FIG. 12.

In the following description, indices for the multiresolution levels in the pyramid wavelet transform are assumed to begin from the highest resolution as shown in FIGS. 12 and 13. The notation in the parentheses indicates the multiresolution level (0–3), the high (H) frequency subbands having horizontal, vertical or diagonal orientations, respectively, and the low (L) frequency subband at each level.

A three-level decomposition of an 8×8 pixel block is depicted in FIG. 12. The wavelet transformed block 1202 comprises four subbands 1210, 1212, 1214, and 1216 being the L, $H_h$, $H_v$, and $H_d$ subbands at scale or level 0. The image block transformed to produce the wavelet transform block 1202 is preferably an 8×8 pixel block as indicated by the double headed arrows.

The L subband 1210 at scale zero is again wavelet transformed to a lower resolution to provide the L, $H_h$, $H_v$, and $H_d$ subbands 1220, 1222, 1224, 1226 at scale 1. A further wavelet transformation of the L subband 1220 yields the L, $H_h$, $H_v$, and $H_d$ subbands 1230, 1232, 1234, 1236 at scale 2. As will be understood by a person skilled in the art, the wavelet transformation can be iteratively applied to a subband until a scale is reached at the lowest resolution where the resulting subband is a 1×1 pixel, as is the case for the scale 2 subbands in FIG. 12.

In FIG. 13, the input image block of 8×8 pixels 1200 is illustrated at the top of the pyramidal wavelet transform structure. Each of the subbands produced by the first wavelet transformation is indicated by an arrow extending from the image 1200 to the corresponding subband 1210, 1212, 1214, and 1216 labelled with the subband indicator LL, LH, HL and HH, respectively. Likewise, the application of the wavelet transformation to the L subband 1210 to produce a lower resolution scale 1, is indicated by arrows extending from the L subband 1210 at level 0 to the subbands 1220, 1222, 1224, and 1226 labelled with labels LLLL, LLLH, LLHL, LLHH, respectively.

A two-dimensional wavelet transform with a depth of I yields N=I+31 subbands. Thus, in FIG. 12, there is a total of 10 subbands. The alternate embodiment uses the high resolution subbands for feature extraction.

In particular, the alternate embodiment uses a pyramidal wavelet transform and energy-based wavelet features as class separability based algorithms for basis selection. The wavelet domain feature set includes local energy measures obtained from the transform coefficients over a region of interest R, such as a subband or a level of the transform pyramid excluding the subband at the lowest resolution (i.e., the L subband in FIG. 12).

Preferably, three energy measures are used including the $l_1$-norm, the $l_2$-norm, and variance of the coefficients over the region of interest R.

The $l_1$-norm of the coefficients over R is given as follows:

$$e_1(x) = \|x\|_1 = \sum_{i=1}^{n} |x_i|, \quad (10)$$

where $x_i$ is the $i^{th}$ transformed coefficient of a region R having n coefficients.

The $l_2$-norm of the coefficients over R is given as follows:

$$e_2(x) = \|x\|_2 = \sum_{i=1}^{n} |x_i^2|. \quad (11)$$

The variance of the absolute coefficients over R is given as follows:

$$e_v(x) = \sum_{i=1}^{n} (|x_i| - \bar{x})^2. \quad (12)$$

In Equation 12, $\bar{x}$ is the mean absolute value of the coefficients over R.

Two normalization schemes are utilized to obtain:

(1) the average energy—the energy over R divided by n, the total number of coefficients in R: and (2) the relative energy—the energy over R divided by the total energy over all coefficients.

The notation for the energy features described above is shown in Table 7.

TABLE 7

| energy | region of interest | |
|---|---|---|
| | level | subband |
| $l_1$-norm | $e_{l1}$ | $e_{s1}$ |
| $l_2$-norm | $e_{l2}$ | $e_{s2}$ |
| variance | $e_{lv}$ | $e_{sv}$ |

In the case of an 8×8 block based, full-scale wavelet transform, there are three features in the level-energy set and nine features in the subband-based energy set.

The class separability measure and feature set selection are now described. In order to achieve good performance for classification, features have to be selected that are most effective in showing the salient differences between distinct classes, so that the data clusters are well separated in the feature space. If fewer classes of feature vectors overlap one another in the feature space, the feature vectors are better able to be separated. Consequently, better performance can be achieved in the classification phase.

A class separability criterion based on within-class and between-class distance measures is used for feature evaluation. The within-class distance measure is defined as $$D_w = \left|\frac{1}{|C|}\right| \sum_{i=1}^{|C|} d(\hat{x} - x_i), \quad \hat{x}, x_i \in C, \quad (13)$$

where $|C|$ is the number of feature vectors in class C, d is a (Euclidean) distance measure, and $\hat{x}$ is the class representative:

$$\hat{x} = \min_j \left(\frac{1}{|C|} \sum_{j \neq i}^{|C|} d(x_i - x_j)\right). \quad (14)$$

Optionally, the class mean vector may be used as the class representative.

The between classes distance $D_b$ is defined as $$\left(D_b = \sum_{i \neq j}^{K} \min(d(\hat{x}_{C_i}, \hat{x}_{C_j}))\right), \text{ with } \hat{x} \in \{\hat{x}_{C_i}, \hat{x}_{C_s}, \ldots, \hat{x}_{C_K}\}, \quad (15)$$

where K is the number of distinct classes in the data set.

The within-class distance $D_W$ provides an assessment of the compactness of a class by calculating the average distance of feature vectors of the class C to a representative class member $\hat{x}$. The between-class distance $D_b$ sums the distance d of class representatives $\hat{x}_{C_i}$ to the respective nearest representative $\hat{x}_{C_j}$ of the other classes.

To have good separability for classification, both a large between-class measure $D_W$ and a small within-class measure $D_b$ are simultaneously required. In the alternate embodiment, both measures are combined by defining the class separability measure as:

$$J = \frac{1}{2} \frac{D_b(\overline{C})}{\sum_i D_w(C_i)}, \quad (16)$$

where $C = \{C_1, C_2, \ldots, C_K\}$ is a set of classes with representatives $\hat{x}_{C_i}$.

A value of J around one (1) indicates the average overlap over all considered classes is very low, while a value close to zero (0) indicates that classification of test data samples is difficult with the chosen feature set.

Using J as the class separability criteria, the energy features derived in wavelet domain using different filters and transform methods produces the results shown in Tables 8 to 11. All the feature sets have been extracted by performing a block-based wavelet transform (8×8 block is used unless specified otherwise) on the training data set.

Table 8 lists the class separability measures estimated from different energy feature sets defined above. An 8×8 Haar transform has been performed on each image in the training set. All the features are derived at each level of the transform pyramid.

The class separability measures in Table 9 shows that the average variance energy feature set $e_v$ give the best classification performance among the wavelet domain feature sets defined above. In the following description, $e_v$ is selected and referred to as the wavelet domain feature set.

TABLE 8

| Feature Set | Class Separability |
|---|---|
| average $e_v$ | 0.911706 |
| average $e_1$ | 0.880033 |
| relative $e_1$ | 0.627975 |
| average $e_2$ | 0.851606 |
| relative $e_2$ | 0.715594 |

Table 9 represents the class separability measures obtained by applying different types of filters to a second training set. It indicates that different filters give similar results while subband based features give slightly better performance than the level-based features.

TABLE 9

| Filter Type | Filter Length | number of features | class separability |
|---|---|---|---|
| Daubechies | 4 | 2 (level energies) | 0.780071 |
| | | 6 (subband energies) | 0.869765 |
| Daubechies | 8 | 1 (level energies) | 0.8053262 |
| | | 3 (Subband energies) | 0.8223574 |
| Haar | 2 | 3 (levels energies) | 0.776416 |
| | | 9 (subband energies) | 0.863850 |

The results of several possible combinations of 2D transform methods and the effect of block size are shown in Table 10 and Table 1.

TABLE 10

| 2D method | 3 level features | 9 subband features |
|---|---|---|
| Standard | 0.766948 | 0.796441 |
| Non-Standard | 0.776416 | 0.863850 |

Table 10 shows that the Non-standard 2D method produces better results and requires lower computational complexity. Therefore, the Non-Standard 2D method is preferable.

Table 11 shows that the class separability increases as the block size increases.

TABLE 11

| block size | 8 × 8 | 16 × 16 | 32 × 32 |
|---|---|---|---|
| class separability | 0.776416 | 0.843544 | 0.886901 |

Again, the sample images with which the alternate embodiment has been developed consist of two image classes, i.e., text and natural images. The first set of images consists of sixteen 8-bit images. The second set of images consists of sixteen 24-bit images. Half the images in each set have been used as a training set and the other half have been used for the run phase. Image sizes of 64×64, 128×128, and 256×256 pixels have been used for text. Sizes of 32×32, 128×128, 254×392, and 420×594 pixels have been used for natural images.

All the training data samples have been generated from the training images is described above. To obtain a large amount of data for training the classifier, a method of overlapped sampling has been adopted to extract sub-blocks of size N×N (i.e., 8×8 is used here unless specified) from each training image with the amount of overlap ranging from 5 to 9 pixels. Approximately 10000 training samples have been generated for each image class.

Generation of fuzzy rules for rule-based segmentation is described hereinafter. In view of the above descriptions of FIGS. 5A, 5B, 6, 7, and 8, the following description is directed towards the differences in the embodiments. The task of the rule-based system is to segment an image into different regions such as text, and natural image regions using rules learned from the set of training samples. Segmentation is performed by local processing of each image block followed by block integration. The block-based approach is preferred because of hardware limitations when processing large image data such as a display screen.

The wavelet domain feature sets discussed above are integrated into the rule-based system. The main steps of the zone segmentation unit according to the alternate embodiment are described with reference to FIGS. 5A and 5B. In the training phase, a training image block is decomposed with a 2D wavelet transform and the energy features are calculated from transform coefficients for each training sample in step 504. In step 506, the salient characteristics of the input domain are learned from training samples and represented as a set of fuzzy rules 506.

Testing (or run phase) image blocks are then classified using the generated rules 508 in accordance with steps 534, 536 of FIG. 5B. A uniform distributed triangular membership function is chose as shown in FIG. 4A. The Haar transform has been used to extract wavelet domain features at each pyramid level.

As shown in Table 12, segmentation using the wavelet domain feature set has a higher correct rate of classification than the spatial domain feature for natural images.

TABLE 12

| feature domain | number of features | correct rate for natural image block | correct rate for text block |
|---|---|---|---|
| wavelet (Haar) | 3 | 99.3412% | 64.75% |
| spatial | 6 | 98.935% | 98.698% |

Over 98% correct classification has been obtained using spatial domain features. Improved performance is achieved for natural image block classification using wavelet domain features but less accurate results have been obtained for text blocks. Wavelet domain features tend to mis-classify text blocks as image blocks.

Classification using wavelet features derived from three different wavelet filters have been performed based on a second run phase data set. Table 13 indicates that different wavelet filters gave similar performance while the subband-based energy features gave slightly better results.

TABLE 13

| feature domain | number of features | correct rate for natural image | correct rate for text |
|---|---|---|---|
| Daubechies D4 | 2 | 99.957% | 52.734% |
| | 6 | 99.826% | 62.196% |
| Daubechies D8 | 1 | 99.978% | 51.812% |
| | 3 | 99.978% | 59.983% |
| Haar | 3 | 99.946% | 57.096% |
| | 9 | 99.523% | 64.551% |
| spatial | 6 | 94.466% | 91.775% |

The effect of the block size on the classification performance is illustrated in Table 14. Increasing the block size for block-based wavelet transform has the effect that the correct recognition rate for text increases rapidly while the performance on the natural images remains the same.

TABLE 14

| block size | number of features | correct rate for natural image | correct rate for text |
|---|---|---|---|
| 8 × 8 | 3 | 99.946% | 57.096% |
| 16 × 16 | 4 | 99.957% | 75.09% |
| 32 × 32 | 5 | 99.785% | 80.332% |

The features used in the fuzzy rule-based system of the alternate embodiment are shown in Table 15:

TABLE 15

| Index | Description | Value Range | Number of regions and its labels |
|---|---|---|---|
| F1 | average $e_v$ of level 0 | [0, 1] | (large, medium, small) |
| F2 | average $e_v$ of level 1 | [0, 1] | (large, medium, small) |
| F3 | average $e_v$ of level 2 | [0, 1] | (large, medium, small) |

Preferably, the feature set F1, F2, and F3 comprise the average $e_v$ of levels 0, 1, and 2 respectively. Optionally, the feature set may comprise nine features being the variance $e_v$ of each subband in a 3-level decomposition.

The rules of the alternate embodiment are based on the features shown in Table 15, and have been determined using 1472 training samples. By eliminating rules that are supported by less than 3 training samples, the following eleven rules shown in Table 16 have been retained.

TABLE 16

| | IF | | | THEN | No. of support samples |
|---|---|---|---|---|---|
| Rule | F1 and | F2 and | F3 | | |
| 1 | M | S | S | TEXT | 51 |
| 2 | S | S | S | NATURAL | 1018 |
| 3 | M | M | S | TEXT | 124 |
| 4 | L | S | S | TEXT | 5 |
| 5 | M | M | M | TEXT | 8 |
| 6 | L | L | S | TEXT | 4 |
| 7 | M | S | M | TEXT | 4 |
| 8 | L | M | S | TEXT | 8 |
| 9 | M | L | S | TEXT | 5 |
| 10 | S | M | S | TEXT | 18 |
| 11 | S | S | M | NATURAL | 3 |

The block size can be increased to capture the spatial variations that characterize text regions. Poor recognition rate associated with using wavelet domain features for text classification can be improved by using larger block sizes for wavelet transform.

From the classified images, most of the text regions are correctly classified. Regions containing large font size text and gaps between text and paragraphs, are likely to be mis-classified. This indicates that the lower recognition rate for text regions partly results from the local nature of the block-based segmentation which sometimes generates sparse mis-classified regions. For example, the characteristics of the gap between two paragraphs in the text region of a screen may locally resemble natural image and therefore classified as image blocks.

Post-Processing

The noted sparse mis-classified regions can be reduced using a block integrating process in which "small" non-colinear areas are taken to have been mis-classified and therefore can be relabelled. As indicated in FIGS. 5B and 7 by steps 540 and 718, post-processing can be carried out to reduce the number of misclassified blocks in images, including ones that have irregular shaped regions resulting from overlapping display windows in the image.

Figure 14:
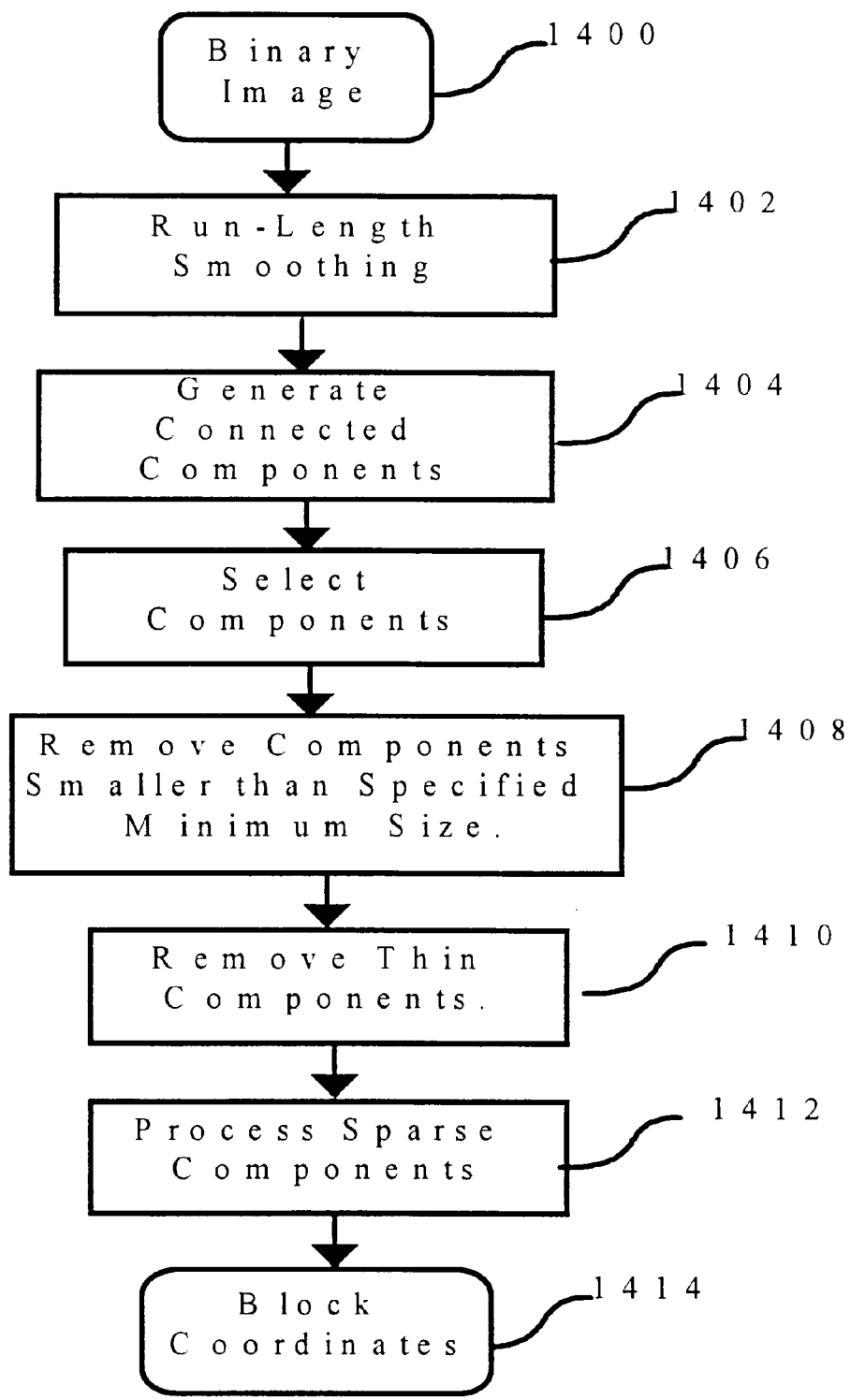
FIG. 14 is flow diagram illustrating post-processing in accordance with the alternate embodiment.
Figure 15:
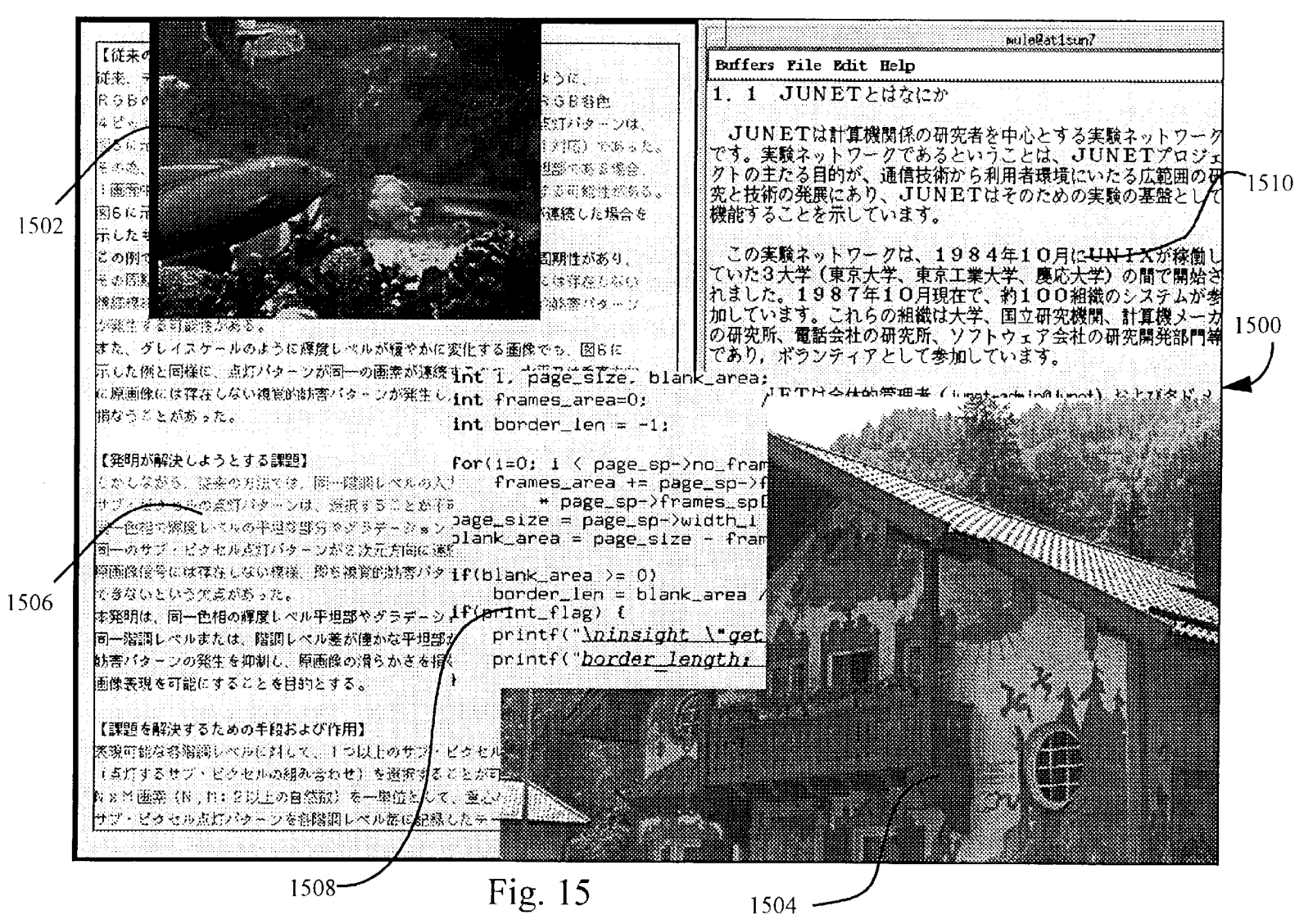

A flow diagram illustrating the post processing or tile integration processing to the carried out in steps 540 or 718 is shown in FIG. 14. For purposes of illustration, the post-processing procedure is described with reference to FIGS. 15 to 19. In particular, FIG. 15 illustrates a mixed image 1500 containing overlapping regions of text 1506, 1508, 1510 and natural images 1502, 1504.

Figure 16:
FIG. 16 is a binary map corresponding to the image shown in FIG. 15 of the results of zone segmentation according to the alternate embodinent.

A binary image 1600, corresponding to that of binary image 1400 of FIG. 4, obtained by zone segmentation of the mixed image 1500 is shown in FIG. 16. The binary image is input where each pixel has a binary value of 1 or 0. The value 1 refers to a white pixel that represents a natural image block (depicted as a light grey pixel (e.g. pixels 1604 and 1610)), and the value 0 refers to a black pixel that represents a non-natural or text image block (depicted by a dark grey pixel (e.g., 1602 and 1612)).

Figure 17:
FIG. 17 illustrates the results of kfill filtering the image of FIG. 15 in accordance with the post processing according to the alternate embodiment.

Optionally, a kFill filter is first applied to the binary image to reduce salt and pepper noise in the image. Preferably, a value of k=2 is used so that small isolated holes are filled less than two blocks. FIG. 17 illustrates the result 1700 of kfill filtering the binary image 1600 for the mixed image 1500 of FIG. 15. It will be noted that misclassified blocks such as 1602, 1610 and 1612 of FIG. 16 have been removed In step 1402, text (non-natural) regions are smoothed by joining the characters, text lines, and paragraphs to a connection regions. The run length smoothing step 1402 operates on the binary image 1700 under which any two black pixels (0's corresponding to non-natural blocks) that are equal to or less than a predetermined threshold T apart, are merged into a continuous stream of black pixels. Thus, for example, if the input sequence is:

00011000010111111000100000111111111110000, and the threshold value T is 3, the result of run length smoothing of the above sequence is:

00000000000111111100000000001111110000.

The run length smoothing step 1402 is applied row-by-row and column-by-column yielding two distinct bit maps. The two results are then combined by applying a logical AND to each pixel location. The threshold in the two directions need not to be the same.

Figure 18:
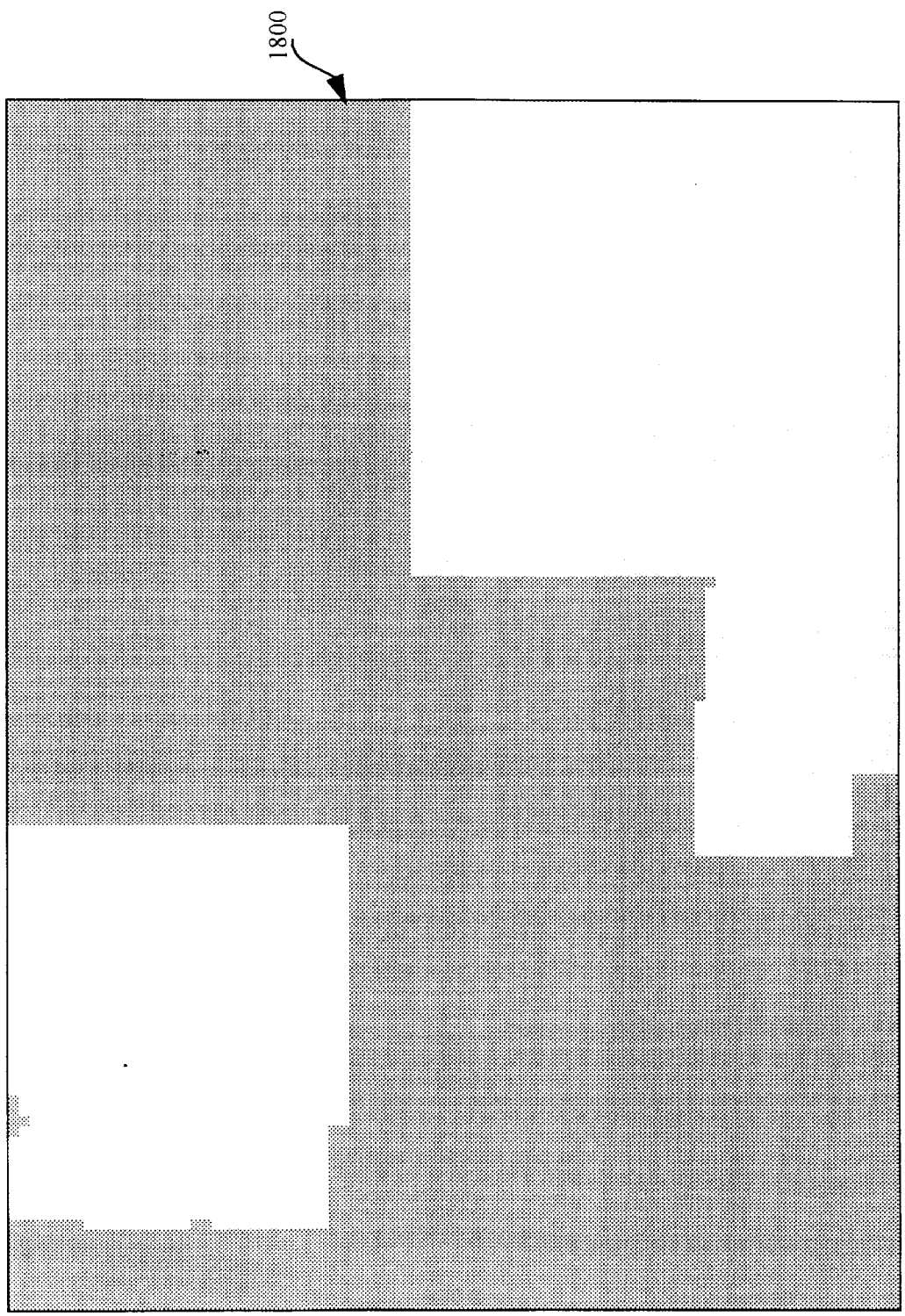
FIG. 18 illustrates the result of run length smoothing the results shown in FIG. 17.

A lot of natural blocks may be scattered within a text region except for the test regions containing high resolution small font texts. The smoothing process 1402 removes these scattered natural blocks by joining text blocks that are very closely located so that characters, text lines and text paragraphs are merged into a bigger region only containing one type of image class. i.e., text. The result 1800 of run length smoothing is shown in FIG. 18.

The smoothing process 1402 also simplifies the next connected component generation step 1404 by reducing the total number of connected components dramatically.

In step 1406, by assuming white pixels are foreground pixels, a connected component generation processing is applied to identify (label) the foreground connected components corresponding to the natural image regions. Coordinates of the surrounding rectangle of each component are measured and retained. Each rectangle thus identifies a single connected component corresponding to a contiguous natural image region. A set of filters is then applied to remove mis-classified natural image blocks based on a set of intuitive constraints.

The output of the connected component generation step 1406 is an information array which specifies: the maximum and minimum coordinates of the surrounding rectangles of connected components, the coordinates of the top and bottom seed of each connected component, and the number of foreground pixels of each component.

Based on this information, in step 1408, a set of attributes is measured for each component:

the x, y sizes $\Delta x, \Delta y$ of the surrounding rectangle of the block;

the area of the surrounding rectangle: $A = \Delta x, \Delta y$;

the number of foreground pixels within each block NF;

foreground pixel density: D=NF/A, which reflects, if D is close to 1, that a block has an approximate rectangular shape; and the dimensional ratio (eccentricity) of the surrounding rectangular of each block: $E=\Delta x/\Delta y$.

A discrimination scheme is applied to either reject or accept a connected component as a member of a foreground region based on its attributes. Intuitive constraints are used including: removing small areas, removing long narrow areas, and sparse natural image region processing.

In step 1410, a constraint on the minimum acceptable natural image is applied to reduce or remove small natural image regions that are unlikely to be an actual region:

A<MINIMUM_AREA.

By ensuring that the threshold MINIMUM_AREA is set below the most popular natural image area, the possibility of discarding valid members of the natural image region is avoided.

In step 1412, as very thin blocks are unlikely Lo be natural image area, such blocks are discarded. The following constraints is used:

E>DIMENSIONAL_RATIO, where DIMENSIONAL_RATIO is set to be 0.1 so that a connected component having a dimensional ratio. DIMENSIONAL_RATIO, of less than 1:10 or greater than 10:1, is discarded.

In step 1414, if a connected component satisfies the following constraint:

S<MINIMUM_DENSITY, it is classified as a sparse block, where S is the sparseness (or density) of the block. The sparseness may refer to the ratio of the number of either text or natural blocks in a region over the total number of blocks in the region. A sparse block may contain overlapping natural and text regions. Instead of assuming it is unlikely to be a natural image area and reclassifying it to text, further processing is needed to identify the overlapping regions. The sparse region processing consists of the following steps:

A. Generate the connected non-natural components in the region;

B. Remove those small and irregular connected non-natural components within the region;

C. Determine the surrounding rectangles of those big and regular connected non-natural components and set those rectangular areas to non-natural; and D. Set the remaining areas in the region to natural.

Figure 19:
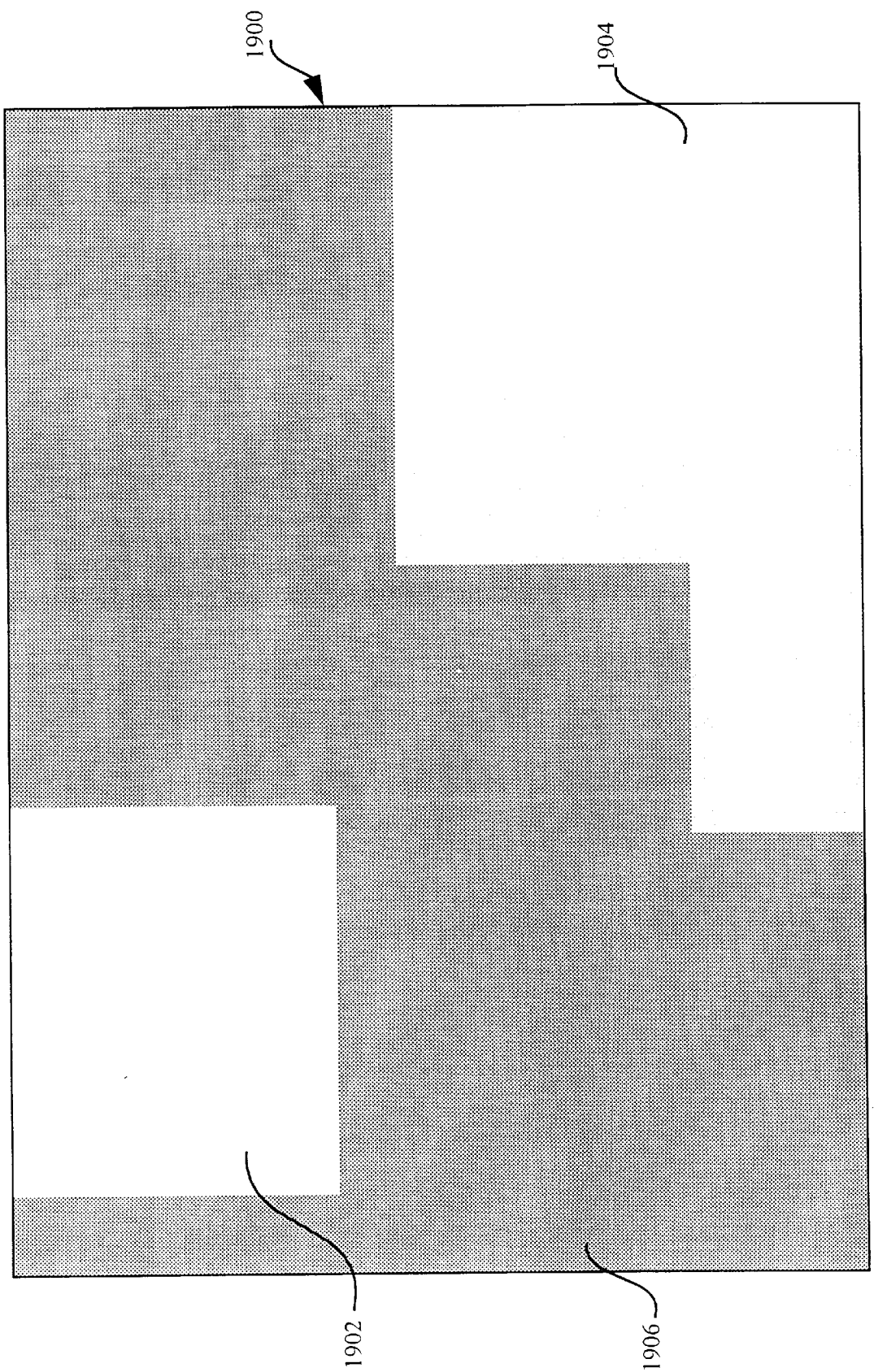
FIG. 19 illustrates the final result of post processing the image of FIG. 15.

The final result 1900 of the post-processing on the image 1500 of FIG. 15 is shown in FIG. 19 where clearly defined text areas (dark grey) 1906 and natural image areas (light grey) 1902, 1904 are shown. Thus, the post-processing procedure shown in FIG. 14 can be used to significantly reduce the number of misclassifications of text blocks in the wavelet transform based zone segmentation technique. The post-processing may optionally be used in an attempt to improve the proper classification of blocks in the spatial domain technique also.

While the embodiments of the invention have been described in terms of spatial domain features and frequency domain features, the invention may be implemented using a combination of the two types of features.

The foregoing describes only a small number of embodiments of the present invention, and modifications, obvious to those skilled in the art, can be made thereto without departing from the scope of the present invention.

The claims defining the invention are as follows:

1. A method for classifying segments of a digital image into text-like portions and non-text-like portions, said method comprising the steps of:

(a) establishing a set of fuzzy detection rules for distinguishing text-like portions of said image from said non-text-like portions of said image; said establishing step including the steps of:

(aa) identifying a plurality of image features that distinguish different portions of an image;

(ab) generating a plurality of fuzzy detection rules by applying different combinations of said features to a text-like learning image and to a non-text-like learning image;

(b) dividing the image into a plurality of segments; and (c) applying said set of fuzzy detection rules to each segment of said image to thereby classify each said segment as being one of a text-like portion and a non-text-like portion.

2. The method as recited in claim 1, wherein said establishing step (a) comprises the further step of:

(ac) minimizing said plurality of fuzzy detection rules to exclude rules that are not supported by a predetermined amount of said learning images, and allocating the non-excluded rules to said set.

3. The method as recited in claim 1, wherein said generating step (ab) comprises the sub-steps of:

(aba) normalising each image feature to have a value in the range 0 to 1;

(abb) partitioning each input feature space into a plurality of equally spaced regions;

(abc) assigning each input feature to a label of one of said regions to maximize a membership value of said label in said one region;

(abd) selecting for each said region the maximized label for each said feature to thus form a respective fuzzy rule.

4. The method as recited in claim 3, wherein adjacent ones of said equally spaced regions overlap.

5. The method as recited in claim 3, wherein each said fuzzy rule comprises a logical ANDed combination of said image features.

6. The method as recited in claim 3, wherein step (abd) comprises determining an output value $O_p$ for a pth input pattern:

$$O_p = \frac{\sum_{i=1}^{K} D_p^i O^i}{\sum_{i=1}^{K} D_p^i}$$

where K is the number of rules, $O^i$ is the class generated by rule i, and $D_p^i$ measures how the pth pattern fits an IF condition of the ith rule, wherein $D_p^i$ is given by the product of membership values of the feature vector for the labels used in the ith rule, such that, $$D_p^i = \prod_{j=1}^{n} m_{ji}$$

where n is the number of features, and $m_{ji}$ is the membership value of feature j for the labels that the ith rule uses.

7. The method as recited in claim 3, wherein said regions correspond to said segments of said test image.

8. The method as recited in claim 1, wherein said image features comprise spatial domain features.

9. A method as recited in claim 8, wherein said image features are selected from the group consisting of:
(i) mean gray level in a region;
(ii) gray-level variance (or standard deviation) in a region;
(iii) absolute value of the gradient;
(iv) mean absolute value of the on-zero gradient in a region;
(v) maximum absolute value of the non-zero gradient in a region;
(vi) standard deviation of the absolute value of the on-zero gradient in a region:
(vii) absolute value of local contrast;
(viii) mean of the absolute value of non-zero local contrast;
(ix) maximum absolute value of the non-zero local contrast in a region;
(x) standard deviation of the absolute value of the non-zero contrast in a region;
(xi) contrast of a darker pixel against its background;
(xii) dominant local orientation;
(xiii) number of gray levels within in a region;
(xiv) number of pixels in the block with maximum gray level in a region;
(xv) number of pixels in the block with gray level larger than mean gray level in a region;
(xvi) number of pixels in block with gray level smaller than mean gray level in a region;
(xvii) directional gradients;
(xviii) transform domain features; and
(xix) x,y direction projections.

10. The method as recited in claim 1, wherein said image features are dependent upon frequency characteristic information of a portion of said image contained in each segment.

11. The method as recited in claim 10, wherein said image features comprise energy features obtained by decomposing said each segment.

12. The method as recited in claim 11, wherein decomposing said each segment is carried out by applying a wavelet transportation at least once to said each segment.

13. The method as recited in claim 1, wherein said segments form a regular array over said image and adjacent ones of segments overlap.

14. The method as recited in claim 1, wherein said segments comprise blocks and are sized in the range of 4×4 pixels to 32×32 pixels, and are preferably 9×9 pixels.

15. An apparatus for classifying segments of a digital image into text-like portions and non-text-like portions, said apparatus comprising:
(a) means for establishing a set of fuzzy detection rules for distinguishing text-like portions of an image from non-text-like portions of an image; said establishing means comprising:
means for identifying a plurality of image features that distinguish different portions of an image;
means for generating a plurality of fuzzy detection rules by applying different combinations of said features to a text-like learning image and to a non-text-like learning image;
(b) means for dividing a test image into a plurality of segments; and
(c) means for applying said set of fuzzy detection rules to each segment of said test image to thereby classify each said segment as being one of a text-like portion and a non-text-like portion.

16. The apparatus as recited in claim 15, wherein said establishing means further comprises:
means for minimizing said rules to exclude those rules not supported by a predetermined amount of said learning images, and allocating the non-excluded rules to said set.

17. The apparatus as recited in claim 15, wherein said generating means further comprises:
means for normalising each image feature to have a value in the range 0 to 1;
means for partitioning each input feature space into a plurality of equally spaced regions;
means for assigning each input feature to a label of one of said regions to maximize a membership value of said label in said one region;
means for selecting for each said region the maximized label for each said feature to thus form a respective fuzzy rule.

18. The apparatus as recited in claim 17, wherein adjacent ones of said equally spaced regions overlap.

19. The apparatus as recited in claim 17, wherein each said fuzzy rule comprises a logical ANDed combination of said image features.

20. The apparatus as recited in claim 17, wherein said selecting means comprises means for determining an output value $O_p$ for a pth input pattern:

$$O_p = \frac{\sum_{i=1}^{K} D_p^i O^i}{\sum_{i=1}^{K} D_p^i}$$

where K is the number of rules, $O^i$ is the class generated by rule i, and $D_p^i$ measures how the pth pattern fits an IF condition of the ith rule, wherein $D_p^i$ is given by the product of membership values of the feature vector for the labels used in the ith rule, such that, $$D_p^i = \prod_{j=1}^{n} m_{ji}$$

where n is the number of features, and $m_{ji}$ is the membership value of feature j for the labels that the ith rule uses.

21. The apparatus is recited in claim 15, wherein said image features comprise spatial domain features.

22. The apparatus as recited in claim 21, wherein said image features are selected from the group consisting of:
(i) mean gray level in a region;
(ii) gray-level variance (or standard deviation) in a region;
(iii) absolute value of the gradient;
(iv) mean absolute value of the on-zero gradient in a region;
(v) maximum absolute value of the non-zero gradient in a region;
(vi) standard deviation of the absolute value of the on-zero gradient in a region;
(vii) absolute value of local contrast;
(viii) mean of the absolute value of non-zero local contrast;
(ix) maximum absolute value of the non-zero local contrast in a region;
(x) standard deviation of the absolute value of the non-zero contrast in a region;

(xi) contrast of a darker pixel against its background;

(xii) dominant local orientation;

(xiii) number of gray levels within in a region;

(xiv) number of pixels in the block with maximum gray level in a region;

(xv) number of pixels in the block with gray level larger than mean gray level in a region;

(xvi) number of pixels in block with gray level smaller than mean gray level in a region;

(xvii) directional gradients;

(xviii) transform domain features; and (xix) x,y direction projections.

23. The apparatus as recited in claim 15, wherein said image features are dependent on frequency characteristic information of a portion of said image contained in each segment.

24. The apparatus as recited in claim 23, wherein said image features comprise energy features obtained by decomposing said each segment.

25. The apparatus as recited in claim 24, wherein decomposing said each segment is carried out by applying a wavelet transformation at least once to said each segment.

26. A method for classifying segments of a digital image for display on display means, wherein said digital image is processed as a plurality of blocks each having a predetermined number of pixels, said method comprising the steps of:

extracting a set of features from each block to generate a feature vector for said block; and classifying said block using a set of fuzzy rules as either a text-type image or a natural-type image dependent on said feature vector for said block, said rules being generated by applying different combinations of said features to a text-like learning image and to a non-text-like learning image.

27. The method according to claim 26, wherein said set of features comprises spatial domain features extracted from pixel values of each block.

28. The method according to claim 27, further comprising the step of:

selecting N features of M possible features, where N and M are integers with $N \leq M$.

29. The method according to claim 28, further comprising, to generate said fuzzy rules using training image data, the steps of:

extracting said N features from each block of said training image data;

assigning a respective label to each of said N features dependent upon the value of said each of said N features;

determining Q fuzzy rules dependent on labels of said N possible features, wherein each of said Q fuzzy rules has a corresponding amount of support based on said blocks of said training image data;

selecting P fuzzy rules of said Q possible fuzzy rules as said set of fuzzy rules, where P and Q being integers with $P \leq M$, dependent upon the corresponding amount of support of each of said P fuzzy rules exceeding a predetermined threshold value.

30. The method according to claim 26, wherein said set of features comprise energy measure features extracted from coefficients in a region of interest for each block.

31. The method according to claim 30, wherein said coefficients are obtained by wavelet transforming each block at least once.

32. The method according to claim 31, further comprising the step of tile integrating classified blocks so as to reduce the number of misclassified blocks.

33. The method according to claim 30, wherein said energy measure features comprise the variance of said coefficients over said region of interest for each block.

34. The method according to claim 33, wherein energy measure features are derived based on two or more scales of resolution of said coefficients in said region of interest.

35. An apparatus for classifying segments of a digital image for display on display means, wherein said digital image is processed as a plurality of blocks each having a predetermined number of pixels, said apparatus comprising the steps of:

means for extracting a set of features from each block to generate a feature vector for said block;

means for classifying said block using a set of fuzzy rules as either a text-type image or a natural-type image dependent on said feature vector for said block, said rules being generated by applying different combinations of said features to a text-like learning image and to a non-text-like learning image.

36. The apparatus according to claim 35, wherein said set of features comprises spatial domain features extracted from pixel values of each block.

37. The apparatus according to claim 36, further comprising means for selecting N features of M possible features, where N and M are integers with $N \leq M$.

38. The apparatus according to claim 37, further comprising means for generating said fuzzy rules using training image data, wherein said generating means comprises:

means for extracting said N features from each block of said training image data;

means for assigning a respective label to each of said N features dependent upon the value of said each of said N features;

means for determining Q fuzzy rules dependent on labels of said N possible features, wherein each of said Q fuzzy rules has a corresponding amount of support based on said blocks of said training image data;

means for selecting P fuzzy rules of said Q possible fuzzy rules as said set of fuzzy rules, where P and Q being integers with $P \leq M$, dependent upon the corresponding amount of support of each of said P fuzzy rules exceeding a predetermined threshold value.

39. The apparatus according to claim 35, wherein said set of features comprise energy measure features extracted from coefficients in a region of interest for each block.

40. The apparatus according to claim 39, wherein said coefficients are obtained by wavelet transforming each block at least once.

41. The apparatus according to claim 40, further comprising means for tile integrating classified blocks so as to reduce the number of misclassified blocks.

42. The apparatus according to claim 39, wherein said energy measure features comprise the variance of said coefficients over said region of interest for each block.

43. The apparatus according to claim 42, wherein said energy measure features are derived based on two or more scales of resolution of said coefficients in said region of interest.

44. A computer program product including a computer readable medium having recorded thereon a computer program for detecting in an image text-like portions and non-text-like portions, the computer program comprising:

(a) establishment steps for establishing a set of fuzzy detection rules for distinguishing text-like portions of said image from said non-text-like portions of said image; said establishing steps comprising:
(aa) identifying a plurality of image features that distinguish different portions of an image;
(ab) generating a plurality of fuzzy detection rules by applying different combinations of said features to a text-like learning image and to a non-text-like learning image;
(b) dividing steps for dividing the image into a plurality of segments; and
(c) application steps for applying said set of fuzzy detection rules to each segment of said image to thereby classify each said segment as being one of a text-like portion and a non-text-like portion.

45. The computer program product as recited in claim 44, wherein said establishing step (a) comprises the further step of:
(ac) minimizing said plurality of fuzzy detection rules to exclude rules that are not supported by a predetermined amount of said learning images, and allocating the non-excluded rules to said set.

46. The computer program product as recited in claim 45, wherein said image feature comprise spatial domain features.

47. A computer program product as recited in claim 45, wherein said image features are selected from the group consisting of:
(i) mean gray level in a region;
(ii) gray-level variance (or standard deviation) in a region;
(iii) absolute value of the gradient;
(iv) mean absolute value of the on-zero gradient in a region;
(v) maximum absolute value of the non-zero gradient in a region;
(vi) standard deviation of the absolute value of the on-zero gradient in a region;
(vii) absolute value of local contrast;
(viii) means of the absolute value of non-zero local contrast;
(ix) maximum absolute value of the non-zero local contrast in a region;
(x) standard deviation of the absolute value of the non-zero contrast in a region;
(xi) contrast of a darker pixel against its background;
(xii) dominant local orientation;
(xiii) number of gray levels within a region;
(xiv) number of pixels in the block with maximum gray level in a region;
(xv) number of pixels in the block with gray level larger than mean gray level in a region;
(xvi) number of pixels in block with gray level small than mean gray level in a region;
(xvii) directional gradients;
(xviii) transform domain features; and
(xix) x, y direction protections.

48. The computer program product as recited in claim 44, wherein said generating step (ab) comprises the sub-steps of:
(aba) normalizing each image feature to have a value in the range 0 to 1;
(abb) partitioning each input feature space into a plurality of equally spaced regions;
(abc) assigning each input feature to a label of one of said regions to maximize a membership value of said label in said one region; and
(abd) selecting for each said region the maximized label for each said feature to thus form a respective fuzzy rule.

49. The computer program product as recited in claim 48, wherein adjacent ones of said equally spaced regions overlap.

50. The computer program product as recited in claim 48, wherein each said fuzzy rule comprises a logical ANDed combination of said image features.

51. The computer program product as recited in claim 48, wherein step (abd) comprises determining an output value $O_p$ for a pth input pattern:

$$O_p = \frac{\sum_{i=1}^{K} D_p^i O^i}{\sum_{i=1}^{K} D_p^i}$$

where K is the number of rules, $O^i$ is the class generated by rule i, and $D_p^i$ measures how the pth pattern fits an IF condition of the ith rule, wherein $D_p^i$ is given by the product of membership values of the feature vector for the labels used in the ith rule, such that, $$D_p^i = \prod_{j=1}^{n} m_{ji}$$

where n is the number of features, and $m_{ji}$ is the membership value of feature j for the labels that the ith rule uses.

52. The computer product as recited in claim 48, wherein said regions correspond to said segments of said test image.

53. The computer program product as recited in claim 44, wherein said image features are dependent upon frequency characteristic information of a portion of said image contained in each segment.

54. The computer program product as recited in claim 53, wherein said image features comprise energy features obtained by decomposing said each segment.

55. The computer program product as recited in claim 54, wherein decomposing said each segment is carried out by applying a wavelet transportation at least once to said each segment.

56. The computer program product as recited in claim 48, wherein said segments form a regular array over said image and adjacent ones of segments overlap.

57. The computer program product as recited in claim 48, wherein said segments comprise blocks and are sized in the range of 4×4 pixels to 32×32 pixels, and preferably 9×9 pixels.

58. A computer program product including a computer readable medium having recorded thereon a computer program for zone segmenting a digital image for display on display means, wherein said digital image is processed as a plurality of blocks each having a predetermined number of pixels, said computer program comprising:
extracting steps for extracting a set of features from each block to generate a feature vector of said block; and
classifying steps for classifying said block using a set of fuzzy rules as either a text-type image or a natural-type image dependent on said feature vector for said block, said rules being generated by applying different combinations of said features to a text-like learning image and to a non-text-like learning image.

59. The computer program product according to claim 58, wherein said set of features comprises spatial domain features extracted from pixel values of each block.

60. The computer program product according to claim 59, further comprising the step of:
- selecting N features of M possible features, where N and M are integers with $N \leq M$.

61. The computer program product according to claim 60, further comprising, to generate said fuzzy rules using training image data;
- extracting steps for extracting said N features from each block of said training image data;
- assigning steps for assigning a respective label to each of said N features dependent upon the value of each of said N features;
- determining steps for determining Q fuzzy rules dependent on labels of said N possible features, wherein each of said Q fuzzy rules has a corresponding amount of support based on said blocks of said training image data; and
- selecting steps for selecting P fuzzy rules of said Q possible fuzzy rules as said set of fuzzy rules, where P and Q are integers with $P \leq M$, dependent upon the corresponding amount of support of each of said fuzzy rules exceeding a predetermined threshold value.

62. The computer program product according to claim 58, wherein said set of features comprise energy measure features extracted from coefficients in a region of interest for each block.

63. The computer program product according to claim 62, wherein said coefficients are obtained by wavelet transforming each block at least once.

64. The computer program product according to claim 63, further comprising the step of tile integrating classified blocks so as to reduce the number of misclassified blocks.

65. The computer program product according to claim 62, wherein said energy measure features comprise the variance of said coefficients over said region of interest for each block.

66. The computer program product according to claim 65, wherein energy features are derived based on two or more scales of resolution of said coefficients in said region of interest.

* * * * *

UNITED STATES PATENT AND TRADEMARK OFFICE
CERTIFICATE OF CORRECTION

PATENT NO.  : 6,195,459 B1
DATED       : February 27, 2001
INVENTOR(S) : Julie Yan Zhu It is certified that error appears in the above-identified patent and that said Letters Patent is hereby corrected as shown below:

Column 2,
Line 7, "die" should read -- the --

Column 5,
Line 43, "die" should read -- the --.

Column 8,
Line 19, "die" should read -- the --.

Column 10,
Line 21, "die" should read -- the --.

Column 11,
Line 18, "lumber" should read -- number --.
Line 59, "call" should read -- can --.

Column 12,
Line 55, "please." should read -- phase. --.

Column 13,
Line 22, "0.0137." should read -- 0.0137, --.
Line 32, "$O_p<0.5$," should read -- $O_p \leq 0.5$, --

Column 16,
Line 53, "N=I+31" should read -- N=1+3I --.

Column 18,
Line 33, "C={C$_1$," should read -- $\overline{C} = \{C_1,$ --.

Line 34, "^^C$_i$." should read -- $\bar{x} C_1.$ --

Column 19,
Line 11, "3 (levels energies)" should read -- 3 (level energies) --.
Line 16, "Table 1." should read -- Table 11. --.

UNITED STATES PATENT AND TRADEMARK OFFICE
CERTIFICATE OF CORRECTION

PATENT NO. : 6,195,459 B1
DATED : February 27, 2001
INVENTOR(S) : Julie Yan Zhu

It is certified that error appears in the above-identified patent and that said Letters Patent is hereby corrected as shown below:

Column 23,
Line 18, "Lo" should read -- to --.

Column 25,
Line 11, "region:" should read -- region; --.
Line 22, "in" should be deleted.

Column 26,
Line 47, "is" should read -- as --.

Column 27,
Line 3, "in" should be deleted.

Column 29,
Line 53, "small" should read -- smaller --.

Column 30,
Line 33, "computer" should read -- computer program --.
Lines 46 and 49, "claim 48," should read -- claim 44, --.

Column 31,
Line 10, "data;" should read -- data: --.

Signed and Sealed this

Sixteenth Day of July, 2002

*Attest:*

JAMES E. ROGAN
*Attesting Officer*  *Director of the United States Patent and Trademark Office*